US005598401A

United States Patent [19]
Blackwell et al.

[11] Patent Number: 5,598,401
[45] Date of Patent: Jan. 28, 1997

[54] APPARATUS AND METHOD FOR A DIGITAL DATA COMMUNICATIONS DEVICE TO OPERATE IN AN ANALOG MODE

[75] Inventors: Steven R. Blackwell; John T. Pearson, both of Huntsville, Ala.; Charles C. Fridlin, IV, Boca Raton, Fla.

[73] Assignee: Motorola, Inc., Schaumburg, Ill.

[21] Appl. No.: 407,749

[22] Filed: Mar. 21, 1995

[51] Int. Cl.$^6$ ...................................... H04L 1/22
[52] U.S. Cl. .................... 379/94; 395/182.02; 370/385
[58] Field of Search .................. 370/13, 16, 17, 370/54, 68.1, 110.1; 395/180, 181, 182.01, 182.02

[56] References Cited

U.S. PATENT DOCUMENTS

| | | | |
|---|---|---|---|
| 5,210,740 | 5/1993 | Anzai et al. | 370/16 |
| 5,406,564 | 4/1995 | Okita | 370/16 X |
| 5,442,622 | 8/1995 | Hokari | 370/16 |
| 5,483,519 | 1/1996 | Satomi et al. | 370/16 |
| 5,490,135 | 2/1996 | Hiraiwa et al. | 370/16 |

*Primary Examiner*—Melvin Marcelo
*Attorney, Agent, or Firm*—Nancy R. Gamburd

[57] ABSTRACT

An apparatus and method for a data communications device to selectively operate in a plurality of analog and digital modes, including as an analog modem, as a digital modem, and as a terminal adapter. The embodiments provide for a single, integrated data communications device to be configured and also subsequently reconfigured to provide for data communications over a variety of networks, including public switched telephone networks, leased line, and digital networks, including T1, E1 and ISDN. The various embodiments further provide for the selection of a primary digital operating mode while simultaneously providing for automatic reconfiguration for an auxiliary or back-up analog operating mode. The various embodiments also provide for signal simulation of the various networks, such that the actual coupled network is transparent to a data terminal transferring information through the data communication device to the network.

42 Claims, 9 Drawing Sheets

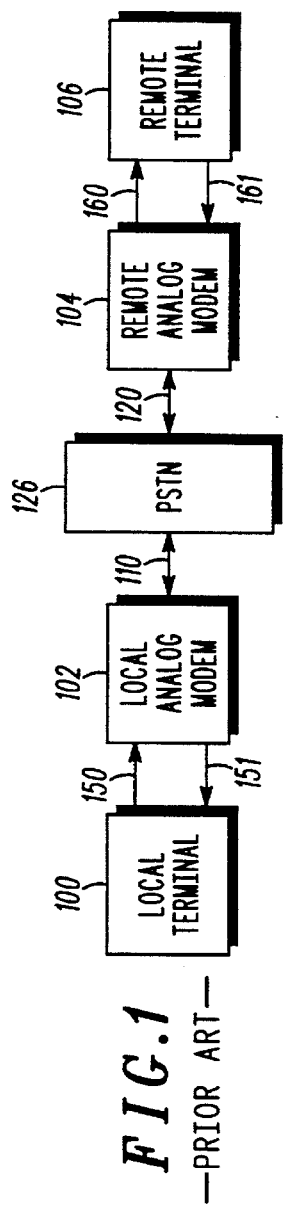
FIG.1 —PRIOR ART—
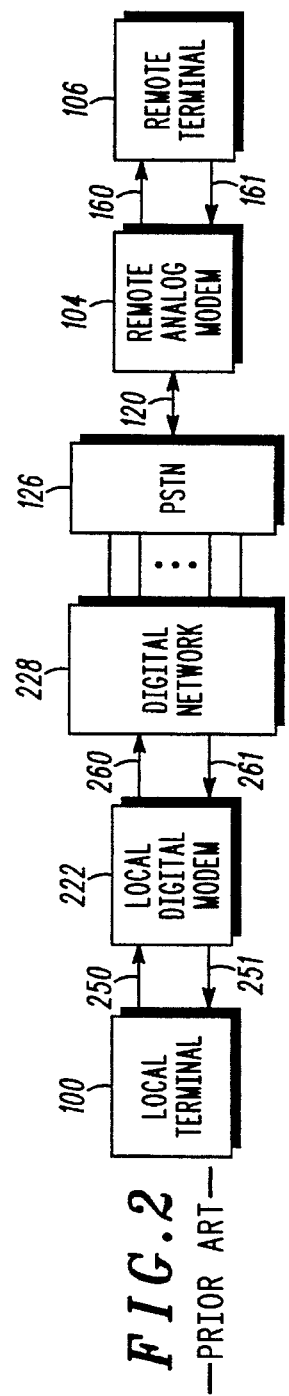
FIG.2 —PRIOR ART—
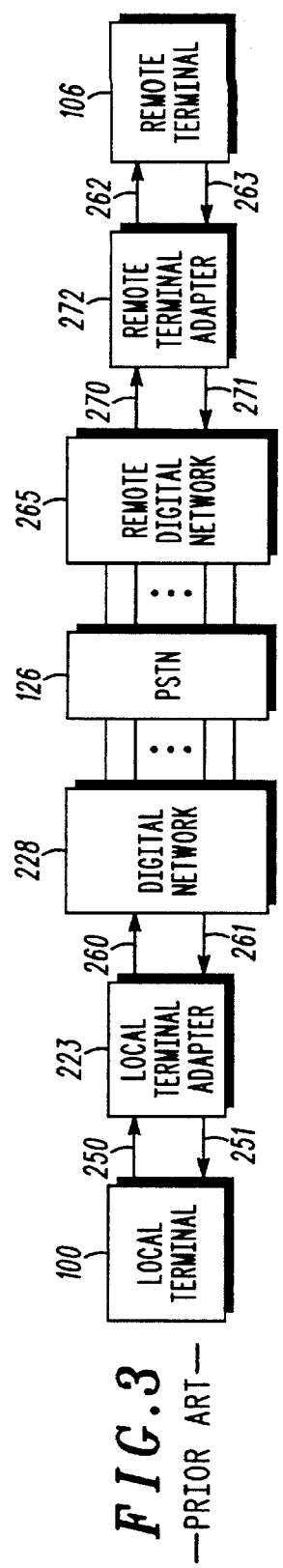
FIG.3 —PRIOR ART—

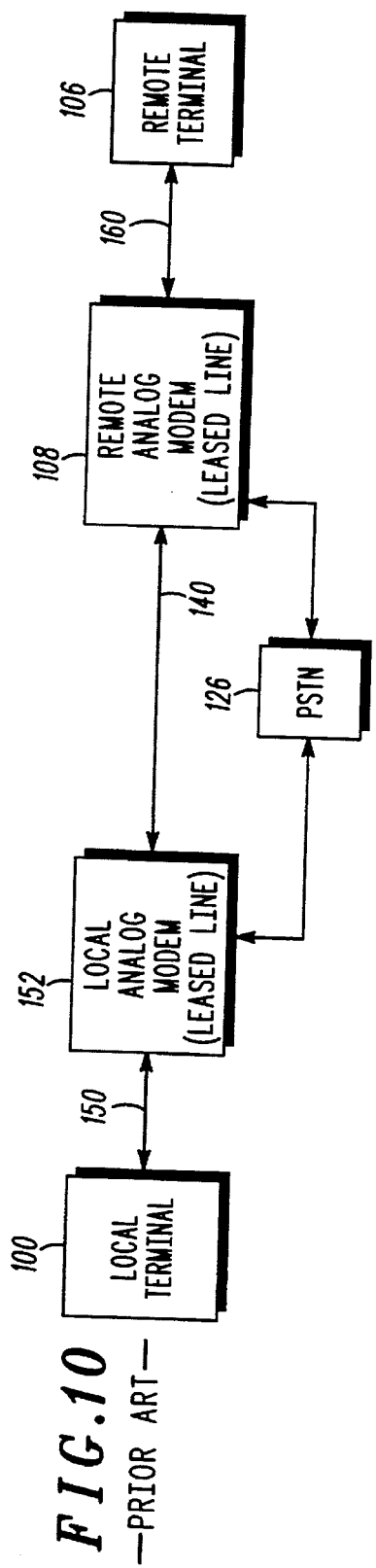
FIG. 10 —PRIOR ART—
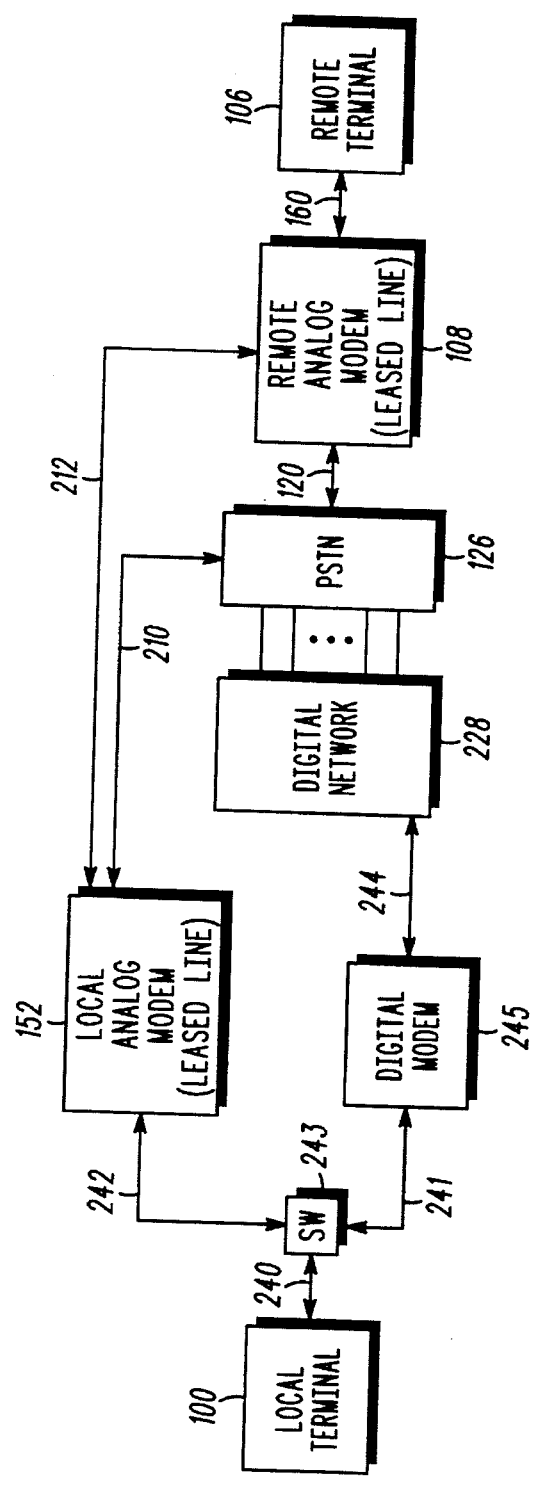
FIG. 11 —PRIOR ART—

# APPARATUS AND METHOD FOR A DIGITAL DATA COMMUNICATIONS DEVICE TO OPERATE IN AN ANALOG MODE

FIELD OF THE INVENTION

This application relates to data communications devices for transmission and reception of data including, but not limited to, analog modems, digital modems, terminal adapters, and other analog or digital data communications devices for data transfer.

CROSS REFERENCE TO RELATED APPLICATION

This application is related to applicants' U.S. patent application Ser. No. 08/395,332, filed Feb. 28, 1995, entitled "Apparatus And Method For A Data Communications Device To Selectively Operate As An Analog Modem, As A Digital Modem, And As A Terminal Adapter", incorporated by reference herein. The present application claims priority for all commonly disclosed subject matter.

BACKGROUND OF THE INVENTION

As discussed in the related U.S. patent application Ser. No. 08/395,332, in the 1970s and through much of the 1980s, a large percentage of data transfers between two or more separate locations were made using analog modems. An analog modem is a data communication device which modulates data and transmits the modulated data as an analog signal, and also receives modulated data as an analog signal and demodulates the received data. Most analog modems receive and transmit the modulated data as an analog signal over one twisted pair of wires, coupled to the Public Switched Telephone Network ("PSTN") through an analog interface circuit.

In addition, analog leased line connections may also be available for analog data transmission over a dedicated, point-to-point line, which does not require network switching for data transfer and, accordingly, does not involve the PSTN. Analog leased line connections are typically implemented using four wires arranged as two "twisted pairs", although two wire leased line service may be available.

A variety of desirable applications, however, such as downloading data files from and transmitting documents to various networks, may require higher speeds of data transmission than is currently practicable, affordable, or available over most analog telephone (PSTN) lines or analog leased lines. Accordingly, many telecommunication providers have begun to offer and to implement various digital transmission services such as, for example, switched digital services, T1 services, E1 services, and Integrated Services Digital Networks ("ISDN"). Many typical digital connections use two such twisted pairs of wires, one for transmission and the other for reception, coupled to a digital network through a digital interface circuit. A typical T1 connection has a data rate of 1.544 Mbps (megabits per second), which is further time division multiplexed ("TDM")into digital (not analog) transmission channels. The T1 connection comprises 24 channels, with each channel referred to as a DS0 having a data rate of 64,000 bps. ISDN systems typically comprise two 64 Kbps "B" channels (for voice and data transmission) and one 16 Kbps "D" channel (for signalling information and low speed packet data). Specifications and standards for ISDN, T1, and E1 services are described in numerous CCITT Recommendations, such as Recommendation G (for T1, E1), and Recommendation I (for ISDN). Other discussions of analog and digital telecommunications services may be found in a wide variety of references, such as R. Freeman, *Reference Manual for Telecommunication Engineers,* John Wiley & Sons, 1985.

Digital modems and terminal adapters have typically been used to transfer data over such digital lines. Digital modems typically further encode the modulated analog signal from a modem, using digital encoding schemes such as pulse code modulation ("PCM"), to transfer the analog signal over a digital line. Such digital modems would typically be used when the other (or remote) modem receiving the data is coupled to an analog line and, therefore, cannot receive the purely digital data which could be communicated over a digital line. Terminal adapters are a type of data communication device designed to transmit and receive digitally encoded data directly from a digital network, without intervening modulation of data onto an analog carrier signal or demodulation of an analog carrier signal into digital data.

Separate data communication devices such as analog modems, digital modems, and terminal adapters, are available and known in the art of modern telecommunications. Each such device, however, is typically incompatible for use in another format or mode, as data communications devices have evolved to be either digital or analog, but not both. For example, in the prior art, an analog modem cannot be used to transmit data on a digital network. Correspondingly, in the prior art, neither a digital modem nor a terminal adapter could be used to transmit data on an analog transmission line.

As modern telecommunications transitions to digital formats, existing analog modems ultimately may be rendered obsolete, with a concomitant loss of investment by users in their analog equipment and other technology. In areas where digital network services have become both available and cost-effective to employ, those users that have transferred to digital services may nonetheless need to communicate with analog networks, and vice-versa. For example, many corporations may employ digital networks for internal communications, while continuing to need analog services for external communications, for example, to allow an employee to log in and enter the system from a remote location over the PSTN. In addition, many current analog system users continue to require analog transmission devices, but may want to plan for the future by investing in data communications equipment which will be compatible with both current analog and future digital transmission schemes.

Current solutions to this compatibility problem have been to essentially build separate analog and digital devices, which may then be incorporated into a single housing. For example, Motorola has manufactured various hybrid devices, such as the HMTA 200, which combines a terminal adapter with digital modem functions. Other manufacturers, such as US Robotics, have simply built physically separate "cards" which separately perform these incompatible digital and analog functions and which separately connect to digital or analog interfaces.

Current solutions to the analog and digital incompatibility problem have been inadequate, however, because such current solutions have simply physically combined otherwise separate sets of analog and digital hardware, into one package having both analog and digital interfaces, often with redundant hardware such as microprocessors, RAM and ROM. The need has arisen, therefore, for a single, integrated data communications device which will provide complete analog and digital data transmission services, heretofore provided by separate, independent, and incompatible devices.

This analog and digital incompatibility problem was discussed and addressed in the related U.S. patent application Ser. No. 08/395,332, which disclosed a novel, single, integrated data communications device which may be selectively configured to operate in such analog and digital modes. In the prior art, these disparate communication modes were provided by separate, independent, and incompatible devices.

In addition to this analog and digital incompatibility problem, moreover, many digital system users continue to require back-up analog systems for data communications over the PSTN, in the event of interrupted, disconnected or otherwise unsatisfactory analog leased line or digital network connections. For example, in circumstances in which a T1, an analog leased line, or an ISDN service is employed, in the event of a line failure, the user may require the capability for immediate reconnection and communication over the analog PSTN to avoid, for example, interruption in customer service and communication. Such reconnection and reestablishment of auxiliary communication over the PSTN is often referred to as "dial back-up".

Dial back-up for analog leased line service has typically been available in the prior art. If the analog leased line service is interrupted, disconnected or otherwise lost, the analog modem having dial back-up capability may establish or re-establish a connection over the PSTN for transferring data. Although establishing the connection over the PSTN may cause a delay because of set up time required, the data connection is nonetheless established and data transfer may continue. When the leased line connection is restored, having been previously disconnected, the modem may disconnect from the PSTN and reconnect to the leased line. The Motorola V.3229 modem is one such analog modem configurable for point-to-point data transfers for leased line operation and also configurable for dial back-up over the PSTN.

Because of the analog and digital incompatibility problem, however, current solutions to providing dial back-up for digital services have also been to essentially build separate analog and digital devices, which may or may not then be incorporated into a single housing, with a switching mechanism to transfer from the digital mode to an analog mode in the event of a failure of the digital line. Current solutions to the problem of providing analog dial back-up for digital systems have been inadequate, however, because just as has been the case with solutions to the incompatiblity problem, such current solutions have simply physically combined otherwise separate sets of analog and digital hardware, into one package having both analog and digital interfaces, often with redundant hardware such as microprocessors, RAM and ROM.

Although the arrangement of the local digital modem (or terminal adapter), coupled with the local analog modem for dial back-up, connection cables, and a switching mechanism responsive to a loss of the digital connection, may function to provide reliable back-up service, such a solution requires, at a minimum, two separate data communications devices plus additional switching hardware. The requirement of two devices to implement one data communications function is inefficient and expensive, involving redundant hardware, additional parts, and additional manufacturing costs. In addition, such duplication creates an inefficient use of rack space for housing the data communications devices, and also is an inefficient use of electrical power required to maintain both devices in an operating state. Hence, the need has arisen for a single, integrated data communications device which will provide analog modem dial back-up for the digital network, both for digital modems and for terminal adapters, heretofore provided by separate, independent, and incompatible devices.

BRIEF DESCRIPTION OF THE DRAWINGS

FIG. 1 is a block diagram which illustrates a prior art use of an analog modem for data transfer.

FIG. 2 is a block diagram which illustrates a prior art use of a digital modem for data transfer to an analog modem.

FIG. 3 is a block diagram which illustrates a prior art use of a terminal adapter for data transfer within digital networks.

FIG. 10 is a block diagram which illustrates a prior art arrangement of an analog modem having dial back-up capability for data transfer over the PSTN.

FIG. 11 is a block diagram which illustrates a prior art use of a digital modem, an analog modem, and a switching mechanism to provide digital data communications service with auxiliary or other back-up analog service.

Figure 4:
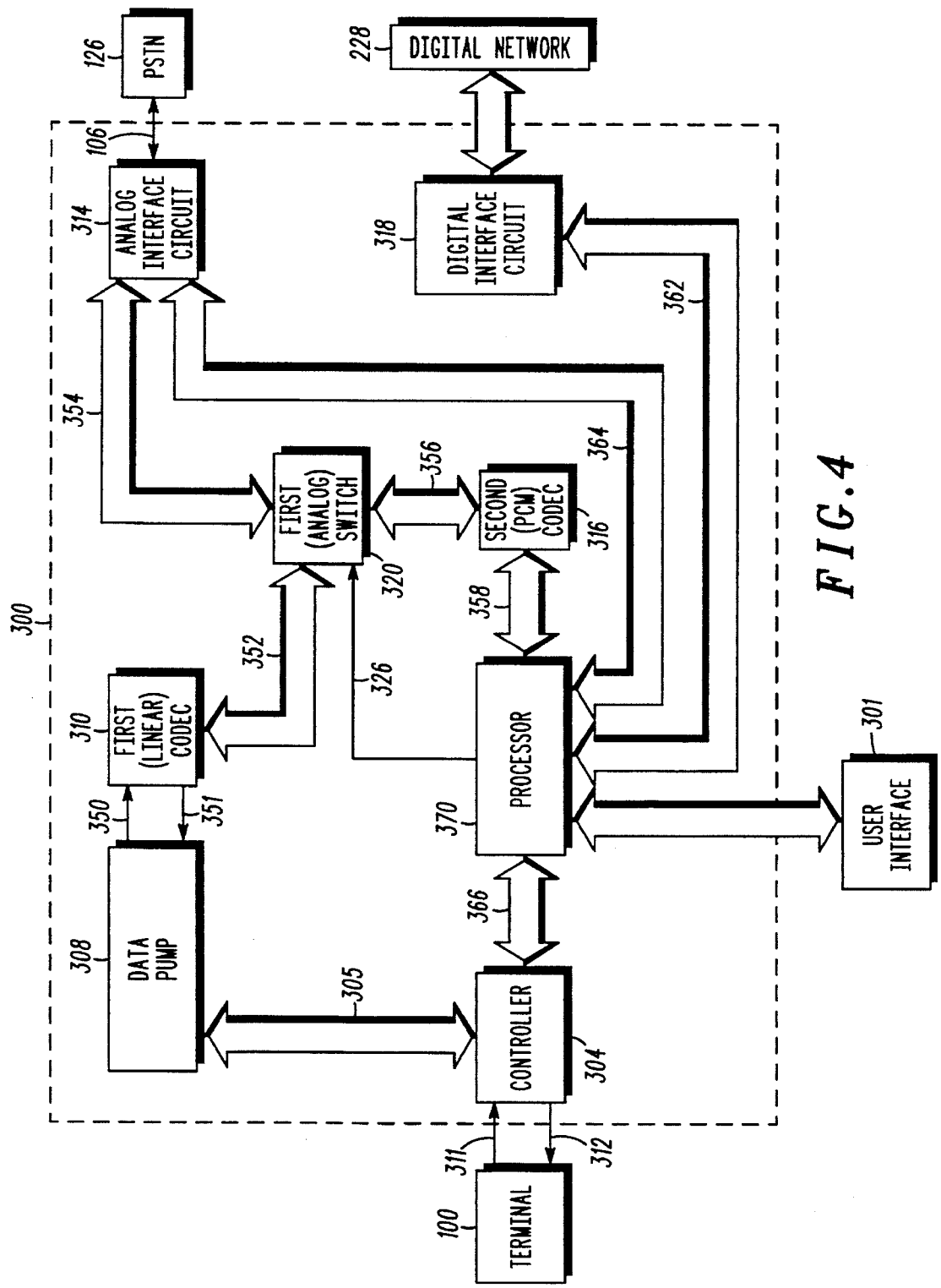
FIG. 4 is a block diagram which illustrates a preferred embodiment of the invention disclosed in related U.S. patent application Ser. No. 08/395,332 and incorporated herein.

APPENDIX A illustrates a source code program for implementation of the switching and simulation aspects of the preferred embodiment of the invention disclosed in related U.S. patent application Ser. No. 08/395,332 and incorporated herein.

DESCRIPTION OF THE PREFERRED EMBODIMENT

FIG. 1 is a block diagram which illustrates a prior art use of an analog modem for data transfer disclosed in related U.S. patent application Ser. No. 08/395,332. As shown in FIG. 1, a local terminal 100, such as a computer, is coupled to a local analog modem 102 via transmit line 150 and receive line 151. Such transmit and receive lines 150 and 151, for example, may be part of an RS 232 interface (and cable) typically employed to couple a computer to a modem. The local analog modem 102 is coupled via line 110 to the PSTN 126. The line 110 may be a standard (twisted pair) telephone line which transmits an analog signal. A remote terminal 106, which may also be a computer, is coupled to a remote analog modem 104 via transmit line 161 and receive line 160. The remote analog modem 104 is coupled via line 120 to the PSTN 126. Line 120, like line 110, may also be a standard telephone line. As indicated in FIG. 1, the local terminal 100 and local analog modem 102 are arranged to transfer data, information and other signals, between a remote terminal 106 having a remote analog modem 104, over the PSTN 126. Data, including information and command signals, are transferred between the terminals and their respective analog modems over the various respective transmit and receive lines 150, 151, 160, and 161. Information from the terminal 100 is modulated and otherwise processed by the local analog modem 102 to form an analog modem signal transmitted to the PSTN 126 over line 110. The analog modem signal is then transferred to the remote analog modem 106 by the PSTN as an analog signal over line 120. Within the PSTN, the analog modem signal may be converted to a digital signal for transmission within the network, and reconverted to an analog modem signal for transmission over the analog lines 110 and 120. The remote analog modem 106 demodulates the received analog modem signal and transmits the demodulated data to the remote terminal over line 160. Information from the remote analog modem 106 may also be transmitted to the local analog modem 102 using the same method operating in the opposite or reverse direction.

FIG. 2 is a block diagram which illustrates a prior art use of a digital modem for data transfer disclosed in related U.S. patent application Ser. No. 08/395,332. As shown in FIG. 2, a local terminal 100, such as computer, is coupled to a local digital modem 222 via transmit line 250 and receive line 251. Such transmit and receive lines 250 and 251, for example, may be part of a digital modem interface (and cable), comparable to the analog RS 232 interface, also typically employed to couple a computer to a digital modem. The local digital modem 222 is coupled via digital transmit line 260 and digital receive line 261 to a digital network 228, which is further coupled to the PSTN 126. The digital transmit and receive lines 260 and 261 may be standard digital lines, such as T1, E1, or ISDN lines, which transmit a digital signal. Also as shown in FIG. 2, remote terminal 106, which may also be a computer, is coupled to a remote analog modem 104 via transmit line 161 and receive line 160. As in FIG. 1, the remote analog modem 104 is coupled via line 120 to the PSTN 126 and line 120 may also be a standard analog telephone line. As indicated in FIG. 2, the local terminal 100 and local digital modem 222 are arranged to transfer data and other information and signals, between a remote terminal 106 having a remote modem 104, over the digital network 228 and the PSTN 126. Data, including information and command signals, are transferred between the terminals and their respective modems over the various transmit and receive lines 250, 251, 160, and 161. Information from the local terminal 100 is first processed by the local digital modem 222 to form a modulated analog signal, which is then further encoded (for example, using a pulse code modulation (PCM) scheme having either a mu-law or an A-law compandor) to form a digital signal transmitted to the digital network 228 and further transmitted to the PSTN 126. The PSTN reconverts the digital signal to a modulated analog signal, which is then transferred to the remote modem 106 by the PSTN as an analog signal over line 120. The remote modem 106 demodulates the received modulated analog signal and transmits the demodulated data to the remote terminal over line 160. Information from the remote modem 106 may also be transmitted to the local digital modem 222 using the same method operating in the opposite or reverse direction.

FIG. 3 is a block diagram which illustrates the prior art use of a terminal adapter to transmit data over local and remote digital networks disclosed in related U.S. patent application Ser. No. 08/395,332. As shown in FIG. 3, a local terminal 100, such as computer, is coupled to a local terminal adapter 223 via transmit line 250 and receive line 251. Such transmit and receive lines 250 and 251, for example, may be part of a terminal adapter interface (and cable), comparable to an analog RS 232 interface, also typically employed to couple a computer to a terminal adapter. The local terminal adapter 223 is coupled via digital transmit line 260 and digital receive line 261 to a digital network 228, which is further coupled to the PSTN 126. As in FIG. 2, the digital transmit and receive lines 260 and 261 may be standard digital lines, such as T1, E1, or ISDN, which transmit a digital signal. As shown in FIG. 3, remote terminal 106, which may also be a computer, is coupled to a remote terminal adapter via transmit line 261 and receive line 260. The terminal adapter 272 is coupled via transmit line 271 and receive line 270 to the remote digital network 265. The local digital network 228 is coupled to the remote digital network 265 via the PSTN 126. As indicated in FIG. 3, the local terminal 100 and local terminal adapter 223 are arranged to transfer data and other information and signals, between a remote terminal 106 having a remote terminal adapter 272, over their respective digital networks 228 and 265, through the PSTN 126. Not shown in FIG. 3, the local and remote terminal adapters may also be coupled to the same digital network, without an intervening PSTN. Data, including information and command signals, are transferred between the terminals and their respective terminal adapters over the various transmit and receive lines 250, 251, 260, and 261. Information from the local terminal is formatted or processed to form a digital signal such as, for example, a DS0 format digital signal, which is then transmitted to the digital network 228, which may be further transmitted to the PSTN 126. The remote digital network 265 receives the digital signal from the PSTN 126, and transmits the digital signal to the remote terminal adapter 272. Not shown in FIG. 3, the remote terminal adapter may also be arranged to receive the digital signal directly from the local digital network 228. The remote terminal adapter decodes the received digital signal and transmits the decoded data to the remote terminal over line 260. Information from the remote terminal 106 may also be transmitted to the local terminal 100 using the same method operating in the opposite or reverse direction.

FIG. 4 is a block diagram illustrating the preferred embodiment of the invention disclosed in related U.S. patent application Ser. No. 08/395,332. As discussed in greater detail below, the data communication device of the preferred embodiment may be selectively configured by the user to operate in any one of a plurality of modes, namely, as an analog modem, as a digital modem, or as a terminal adapter. In addition, after a first operating mode is selected, the data communication device of the preferred embodiment may be reconfigured by the user to operate in a second, third or otherwise different operating mode. As shown in FIG. 4, a data communication device 300 is coupleable to a terminal 100 to transmit and receive data over the PSTN 126, when coupled to the PSTN 106 through an analog interface circuit 314 (also known as a data access arrangement or "DAA"), and to transmit and receive data over the digital network 228, when coupled to the digital network 228 through a digital interface circuit 318. As used herein, "digital network" or "digital communications network" shall also include digital connections or interfaces to the central office of the public switched network, including through T1 or E1 interfaces, in addition to digital networks such as ISDN. The user of the data communications device 300 may select the type of operating mode (as an analog modem, as a digital modem, or as a terminal adapter), through a plurality of user command signals entered via the user interface 301 coupled to the processor 370. The user may initially select a particular operating mode, and may subsequently change or revise the operating mode. For example, a user may initially couple the data communication device 300 to a first communications network such as the PSTN 126, and correspondingly select the operating mode of the device to be as an analog modem, through user command signals entered through the user interface 301. Subsequently, the user may have capability to access a second communications network, such as a T1, ISDN or other digital networking interface or capability installed at the user facility. The user may then reconfigure the data communication device 300, through other user command signals (from the plurality of user command signals) entered through the user interface 301, to operate in various digital operating modes, such operating as a digital modem or operating as a terminal adapter.

The user interface 301 may have many types of embodiments. For example, the user interface may be a dedicated personal computer and, in that event, may be incorporated within the terminal 100. In other embodiments, the data communication device 300 may be one of many devices coupled to a network and may have an overall system controller, such as a Motorola DAS 925 with a system manager, described in detail in the pending United States patent application Ser. No. 08/285,260, entitled "Advanced Communication System Architecture", filed Aug. 3, 1994, and incorporated by reference herein. In that case, the user interface 301 may be incorporated within the overall system controller, which could be used to simultaneously configure all of the data communication devices 300 for the desired operating mode to appropriately match the installed PSTN or digital network.

As shown in FIG. 4, the controller 304 is coupleable to the terminal 100 through transmit data line 311 and receive data line 312. The transmit and receive data lines 311 and 312 may be incorporated within any appropriate interface and cabling arrangement. The controller 304, which may be a Motorola 68302 microcontroller, is coupled via data bus 305 to a data pump 308, which may be a Motorola 56002 general digital signal processor programmed as a data pump. The data pump 308 receives data, command signals and other information from the controller 304, and the data pump 308 then generates a sampled data signal. The data pump 308 is also coupled via transmit and receive lines (or bus) 350 and 351 to a first codec ("coder-decoder") 310. A coder-decoder is known as and referred to in the communications field as a "codec", and shall also be referred to herein as a "codec". The first codec 310 is preferably a linear codec, and receives the sampled data signal from the data pump, typically at a sampling rate of 9600 samples per second, and then generates a modulated analog signal from the sampled data signal. The first or linear codec 310 is also known and may be implemented as an analog-to-digital (A/D) converter and digital-to-analog (D/A) converter. The modulated analog signal from the linear codec 310 is transmitted via line or bus 352 to the first switch 320. In the preferred embodiment, the first switch 320 is an analog switch, and may be implemented in any number of forms, such as a solid state or mechanical relay, or as a discrete transistor or integrated circuit arrangement (e.g., CMOS, BJT). The first switch 320 may also include a plurality of otherwise separate switching mechanisms, for example, to correspond to each separate data path of the data busses. The first switch 320, in turn, in response to a control signal transmitted via line 326, may route the modulated analog signal from the linear codec 310 to a first interface circuit, shown in FIG. 4 as the analog interface circuit 314, via bus 354, or may route the modulated analog signal to the second codec 316, shown in FIG. 4 as a preferably a non-linear PCM (pulse code modulation) codec 316, via bus 356.

Continuing to refer to FIG. 4, the processor 370 consists of a microprocessor, such as an Intel 8032, and digital switching circuits, such as a digital multiplexer ("MUX"), to form a programmable distributed switching mechanism. The processor 370 provides a control signal to the first switch 320 via line 326. In the preferred embodiment, the control signal has first and second values, such as a high voltage (a logic one (1)), and a low voltage (a logic zero (0)). The switch 320, in response to the control signal having the first value, such as a high voltage, transmits the modulated analog signal from the linear codec 310 to the first (analog) interface circuit 314 via bus 354, and in response to the control signal having the second value, such as a low voltage, transmits the modulated analog signal to the non-linear PCM codec (or "PCM codec") 316 via bus 356. Alternatively, the control signal having two values may also be considered to be two signals and, in that event, may be considered first and second control signals. From the analog interface circuit 314, the modulated analog signal may then be transmitted via line 106 through the first communications network shown in FIG. 4 as PSTN 126, and in this mode, the data communications device 300 is operating in a first mode as an analog modem. The first interface circuit such as the analog interface circuit 314 would also typically provide a variety of functions, such as power level setting, impedance matching, and may include hybrid circuitry to transfer information from two sets of twisted pair transmission lines to one pair of transmission lines.

The processor 370 is further coupled to the second (PCM) codec 316 via bus 358, to the analog interface circuit 314 via bus 364, to the controller 304 via bus 366, and to the digital interface circuit 318 via bus 362. In response to the control signal from the processor 370 having the second value, such as a low voltage, the switch 312 transmits the modulated analog signal to the PCM codec 316. The PCM codec digitally encodes the modulated analog signal using a pulse code modulation scheme to provide a digital modem signal and, in this second operating mode, the data communication device is operating as a digital modem. The PCM codec 316 transmits the digital modem signal to the processor 370, which routes or transmits the the digital modem signal to the second interface circuit, shown in FIG. 4 as digital interface circuit 318, via bus 362. The second or digital interface circuit 318 is coupleable to a second communications network, shown in FIG. 4 as digital network 228, and processes the digital modem signal for transmission over the second (digital) network. For example, the digital interface circuit may act as a time division multiplexer to place the digital modem signal, having a DS0 format, in the appropriate digital channel or time slot.

The processor 370 also receives from and transmits to the controller 304, via bus 366, various data signals and control signals. In the event the data communication device 300 is to be operable in a third operating mode, as a terminal adapter, as determined by one of the plurality of user command signals from the user interface, the processor transmits a processor command signal to the controller via bus 366. In the third or terminal adapter mode, the controller processes digital information received from the terminal to form a digital information signal, and transmits the digital information signal to the processor 370 via bus 366. The processor 370, in turn, routes or transmits the digital information signal via bus 362 to the digital interface circuit 318 for transmission over the digital network 228. The digital interface circuit 318 also processes the digital information signal for transmission over the digital network, in a manner identical to the processing of a digital modem signal discussed above.

While the preferred embodiment of the present invention illustrated in FIG. 4 has been described in detail with regard to information transmission, it will be understood by those skilled in the art that a similar analysis applies with regard to information reception. Accordingly, such data or information transmission and reception are generally referred to as data or information transfer to accomodate the bidirectional flow of data.

In summary, FIG. 4 illustrates a data communications device selectively operable in at least one of a plurality of operating modes, including a first operating mode and a second operating mode, the data communications device coupleable to a terminal and to at least one of a plurality of communications networks for transferring data between the terminal and one of the plurality of communications networks, including a first communications network and a second communications network, the data communications device comprising: a controller; a data pump coupled to the controller; a first codec coupled to the data pump; a second codec; a first interface circuit coupleable to the first communications network; a second interface circuit coupleable to the second communications network; a first switch coupled to the first codec, to the second codec and to the first interface circuit; and a processor coupled to the controller, to the second codec, to the first interface circuit, to the second interface circuit, and to the first switch, the processor responsive to at least one of a plurality of command signals to selectively configure the data communications device for operation in the first operating mode for communications through the first communications network and for operation in the second operating mode for communications through the second communications network. The various first and second codecs may be linear or non-linear, and in the preferred embodiment, the first codec is a linear codec and the second codec is a non-linear PCM codec, having a mu-law or an A-law compandor. The first and second communications networks may be a PSTN, T1, E1, ISDN, or any other analog or digital communications networks.

Accordingly, FIG. 4 also illustrates a data communications device wherein the first communications network is a public switched telephone network, the second communications network is a digital communications network, the first interface circuit is an analog interface circuit, the second interface circuit is a digital interface circuit; and wherein the processor is responsive to a first command signal of the plurality of command signals to produce a first control signal to the first switch to selectively couple the first codec to the analog interface circuit and to couple the first codec to the second codec, whereby the data communications device is configured in an analog modem operating mode when the first codec is coupled to the analog interface circuit, and whereby the data communications device is configured in a digital modem operating mode when the first codec is coupled to the second codec. FIG. 4 further illustrates a data communications device wherein the processor is further responsive to a second command signal of the plurality of command signals to produce a second control signal to the controller whereby the data communications device is configured in a terminal adapter mode for the processor to transfer data through the digital interface circuit to the digital communications network. Also as shown in FIG. 4, the data communications device may further comprise an input port coupled to the processor and coupleable to a user interface for entry of at least one of the plurality of command signals.

Figure 5:
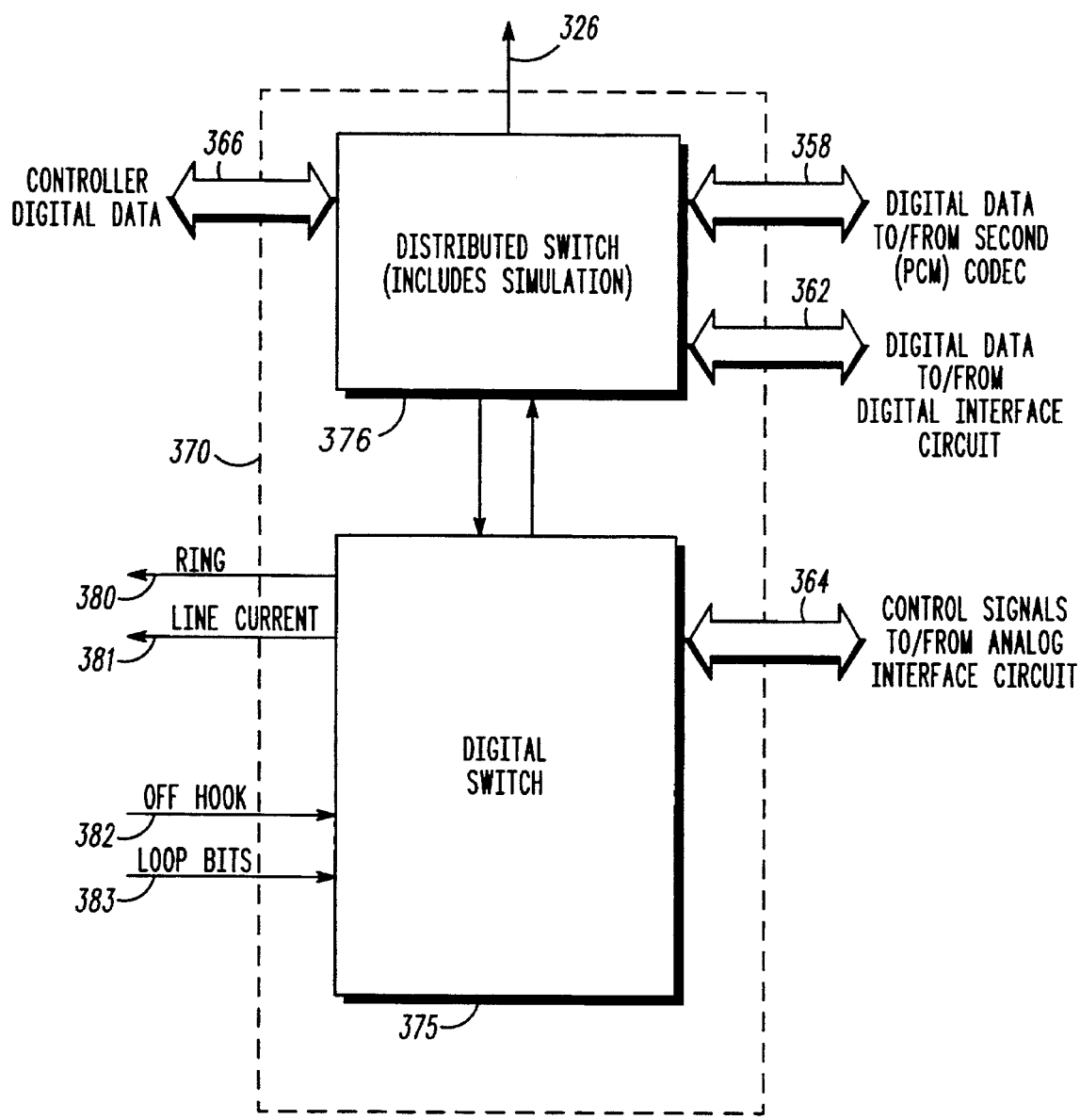
FIG. 5 is a block diagram which illustrates the digital switching mechanisms of the processor of the preferred embodiment of the invention disclosed in related U.S. patent application Ser. No. 08/395,332 and incorporated herein.

FIG. 5 is a block diagram which illustrates the distributed switching mechanism of the processor 370 in the preferred embodiment of the invention disclosed in related U.S. patent application Ser. No. 08/395,332. In the preferred embodiment, the typical "analog modem aspects" of the data communication device 300, namely, the controller 304 and the data pump 308, do not require any separate information or programming concerning the type of network with which the data communication device 300 will be communicating. For example, these "analog modem aspects" do not need to be programmed to recognize or otherwise "know" if the device will be coupled to a PSTN or a digital network. In the preferred embodiment, as shown in FIG. 5, this is accomplished through the processor 370, which includes distributed switching circuits 376 and digital multiplexers 375 comprising a distributed switching mechanism, such that predetermined signalling and notification information transmitted to and from the network (via bus 362 and bus 364) are either transmitted (switched through) to and from the controller 304, or are simulated by the processor 370, and the simulated signalling information is then transmitted (switched through) to and from the controller 304. The predetermined signalling information (or plurality of information signals) would typically include, for the analog mode, the ring signal to the controller via line 380, line current to the controller via line 381, the off hook signal from the controller via line 382, and the loop bits (or loop signal) from the controller via line 383, and for the digital mode, signalling bits such as the A and B signalling bits (and, for other formats, also C and D signalling bits) on bus 362. The off hook and the ring signals are also known as notification signals and, as used herein, are referred to collectively with the other signals as signalling information or as information signals. Lines 380, 381, 382, and 383 may also be part of the bus 366 coupling the controller 304 and the processor 370, and are shown as separate lines in FIG. 5 (and in FIG. 6) for ease of reference purposes only.

Figure 6:
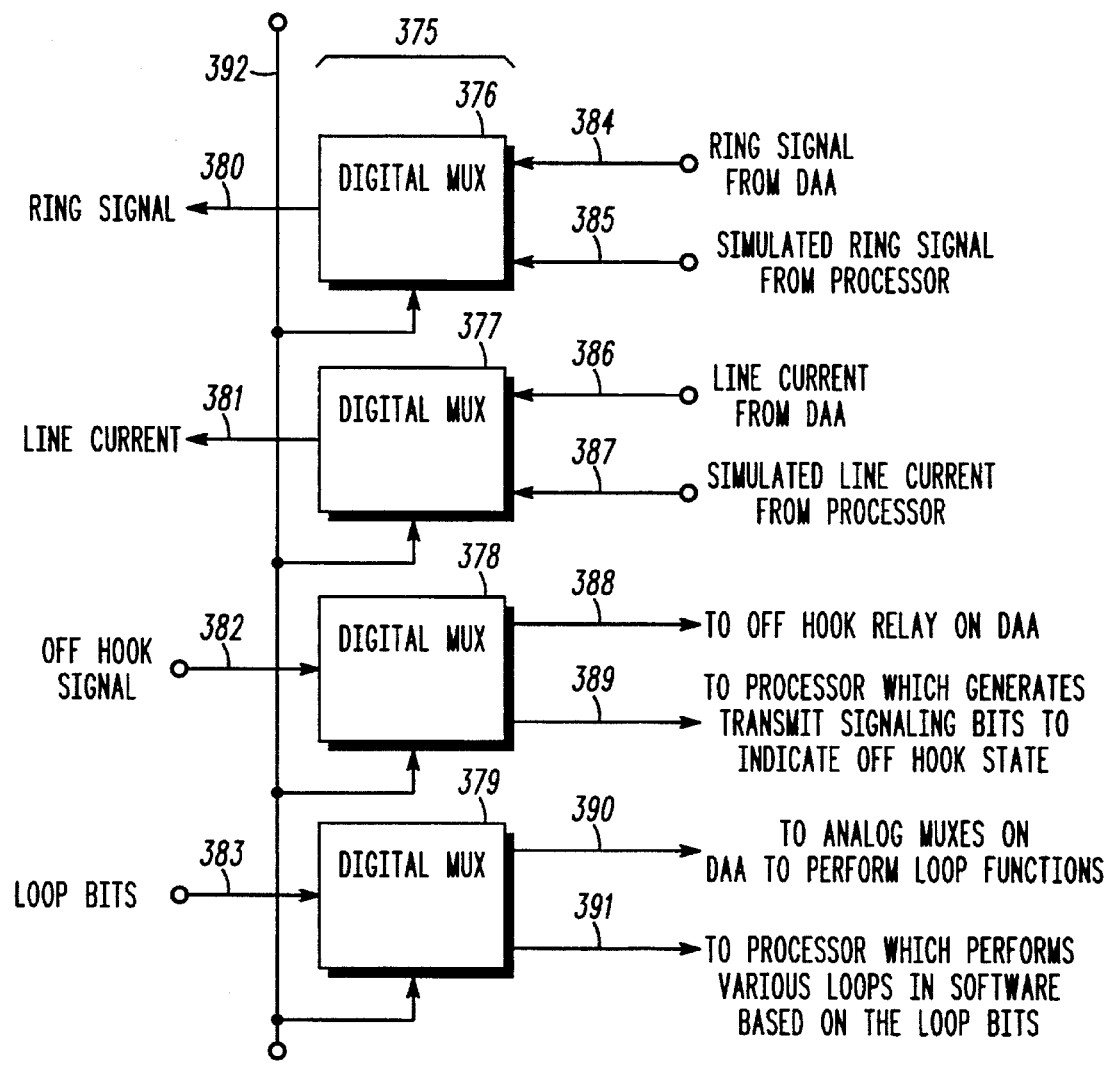
FIG. 6 is a block diagram which illustrates the digital multiplexing of the processor of the preferred embodiment of the invention disclosed in related U.S. patent application Ser. No. 08/395,332 and incorporated herein.

FIG. 6 is a block diagram illustrating in greater detail the digital multiplexers ("MUX") 375 of the processor 370, also disclosed in related U.S. patent application Ser. No. 08/395, 332. The multiplexers 375 are controlled by a MUX control signal on line 392 from other parts of the processor 370, as configured by the plurality of user command signals discussed above. As shown in FIG. 6, the ring signal to the controller on line 380 may be transmitted directly from the analog interface circuit 314 on line 384 or may be simulated by the processor and transmitted on line 385, in response to corresponding or equivalent digital signalling information from the digital interface circuit 318. The line current on line 381 also may be transmitted directly from the analog interface circuit 314 on line 386 or may be simulated by the processor and transmitted on line 387, also in response to corresponding digital signalling information from the digital interface circuit 318. The off hook signal from the controller (to initiate or place a call) on line 382 may be transmitted directly to the analog interface circuit 314 on line 388 or may be simulated by the processor (which generates the appropriate signalling bits), and transmitted on line 387 to the digital interface circuit 318. Similarly, the loop bits from the controller (for diagnostic or "training" purposes) on line 383 also may be transmitted directly to the analog interface circuit 314 on line 390 or may be transmitted on line 391 to other parts of the processor (which performs the appropriate software loops based upon the loop bits). The digital interface signalling bits, such as the A and B signalling bits, may vary depending upon the actual signalling scheme employed in the particular network, such as LOOP, GROUND, TRUNK, TRUNK with WINK, FEATURE GROUP B, and FEATURE GROUP D. These various modes are user selectable (or programmable) through the plurality of user command signals entered via the user interface 301.

In summary, FIG. 5 and FIG. 6 further illustrate a data communications device wherein the processor, in response to digital signalling information from a digital network, provides corresponding simulated analog signalling information to the controller; and wherein the processor, in response to analog signalling information from the controller, provides corresponding simulated digital signalling information to a digital network. In addition, the analog signalling information may comprise a ring signal, line current, off hook, and loop bits, and the digital signalling information may comprise A and B bits.

Figure 7:
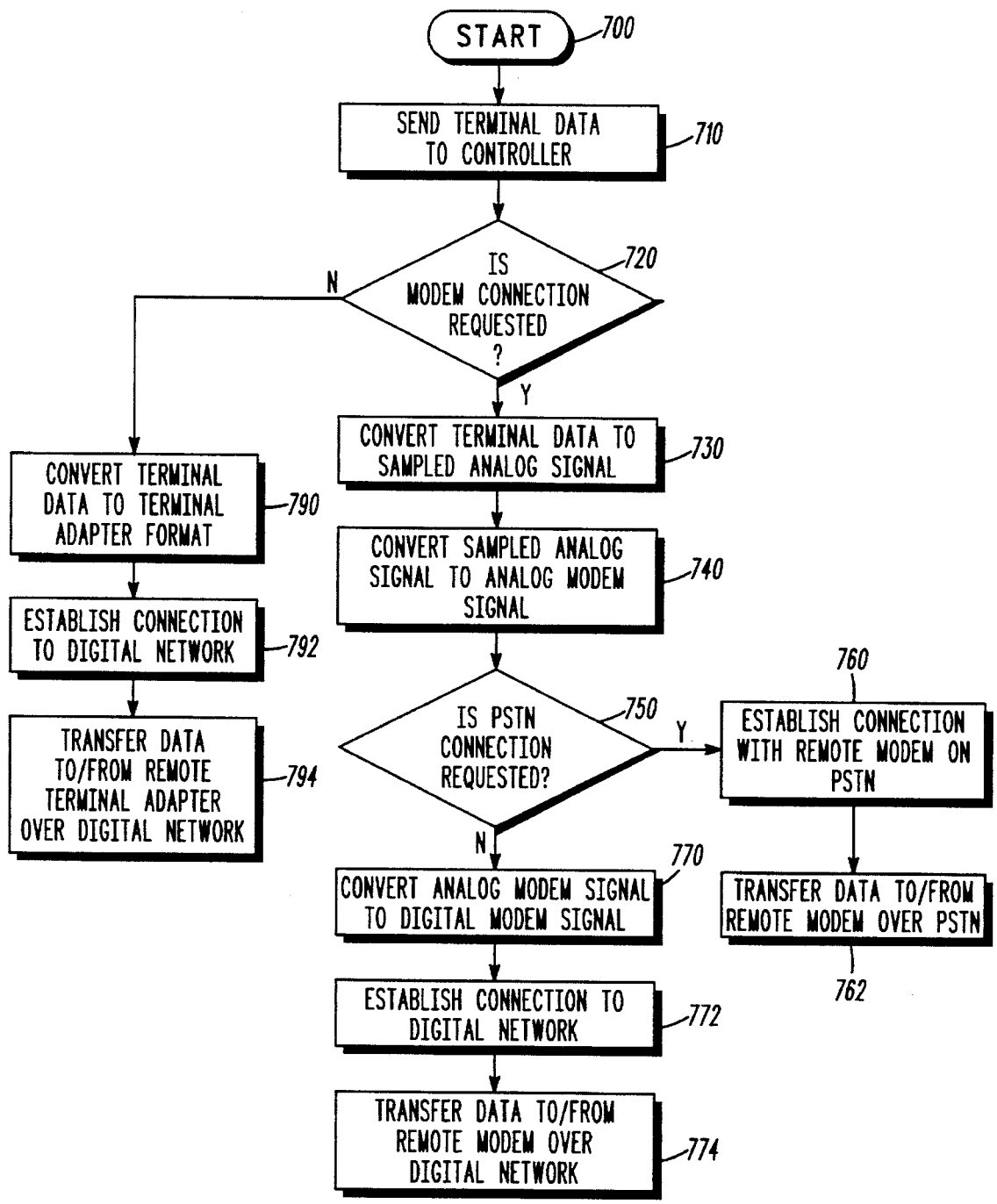
FIG. 7 is a flow chart which illustrates the method of the preferred embodiment of the invention disclosed in related U.S. patent application Ser. No. 08/395,332 and incorporated herein.

FIG. 7 is a software flow diagram which illustrates the multiple configuration and data transfer method of the preferred embodiment of the invention disclosed in related U.S. patent application Ser. No. 08/395,332. The method begins at start step 700, and the terminal sends data to the controller, step 710. The processor determines whether an analog modem or digital modem connection is requested, step 720. If a modem connection is not requested, the data communication device proceeds in terminal adapter mode and converts the data from the terminal 100 to a terminal adapter mode format, step 790. The data communication device 300 then establishes a connection to the digital network, step 792, and transmits data to (and from) the remote terminal adapter over the digital network, step 794.

Continuing to refer to FIG. 7, if a modem connection is requested in step 720, the data from the terminal is convened to a sampled analog signal, step 730, and the sampled analog signal is convened to an analog modem signal, step 740. The processor then determines whether a PSTN connection is requested, step 750. If a PSTN connection is requested, a connection is established with a remote modem via the PSTN, step 760, and the analog modem signal is transmitted to (or received from) the remote modem, step 762. If a PSTN connection is not requested in step 750, the analog modem signal is convened to a digital modem signal, step 770. The data communications device then establishes a connection to the remote modem over the digital network (and the PSTN), step 772, and transfers data to and from the remote modem over the digital network and the PSTN, step 774.

In summary, FIG. 7 illustrates a method of selectively operating a data communications device in at least one of a plurality of operating modes, including a first operating mode and a second operating mode, the data communications device coupleable to a terminal and to at least one of a plurality of communications networks for transferring data between the terminal and one of the plurality of communications networks, including a digital communications network and an analog communications network, the method comprising: (a) receiving data from the terminal; (b) selecting an operating mode, which may further include entering at least one of a plurality of user command signals; (c) converting the received data to terminal adapter format data when the terminal adapter operating mode has been selected and transferring the terminal adapter format data to or from the digital network; (d) modulating the received data to form an analog modem signal when the modem operating mode has been selected; (e) routing the analog modem signal to the analog network when a analog modem operating mode has been selected; and (f) digitally encoding the analog modem signal and routing the digitally encoded analog modem signal to the digital network when a digital modem operating mode has been selected. Steps (e) and (f) above may also further comprise: providing a control signal to selectively engage the analog communication network or the digital communication network.

In addition, as illustrated in FIGS. 4-7, the method of operating a data communications device of the present invention further comprises: (g) responding to analog and digital signalling information. This step, in turn, may further include: (g1) simulating analog signalling information from received predetermined digital signalling information; and (g2) simulating digital signalling information for transmission from predetermined analog signalling information.

Figure 8:
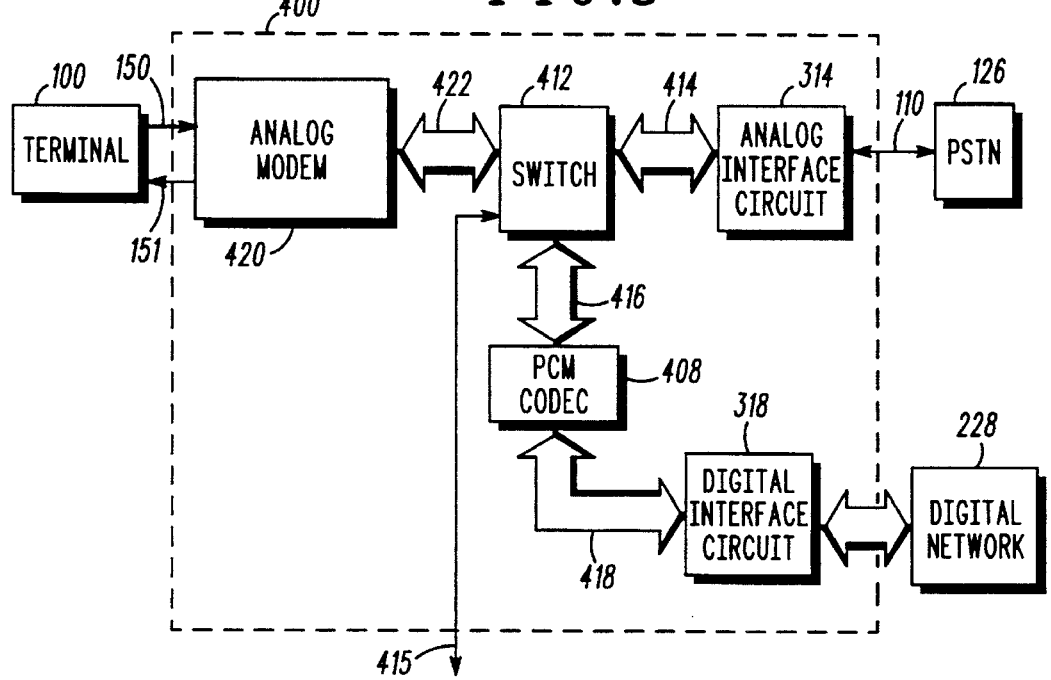
FIG. 8 is a block diagram which illustrates a second embodiment of the invention disclosed in related U.S. patent application Ser. No. 08/395,332 and incorporated herein.

FIG. 8 is a block diagram which illustrates a second embodiment of the invention disclosed in related U.S. patent application Ser. No. 08/395,332. As shown in FIG. 8, the terminal 100 is coupleable to the data communications device 400 via transmit line 150 and receive line 151. These transmit and receive lines 150 and 151 are coupled to an analog modem 420, which transmits and receives an analog modem signal over bus 422. Bus 422 is coupled to a switch 412. In response to a control signal via line 415, the switch 412 may route the analog modem signal to the analog interface circuit 314 via bus 414, for transmission over the PSTN 126. Also in response to a control signal via line 415, the switch 412 may route the analog modem signal via bus 416 to the PCM codec 408. The PCM codec 408 converts the analog modem signal to a digital modem signal transmitted to the digital interface circuit 318 via bus 418, for transmission over the digital network 228.

In summary, FIG. 8 illustrates a data communications device selectively operable in an analog modem mode and in a digital modem mode, the data communication device coupleable to a terminal, and coupleable to a public switched telephone network or to a digital communication network, the data communication device comprising: an analog modem coupleable to the terminal; a PCM codec; an analog interface circuit coupleable to the public switched telephone network; a digital interface circuit coupled to the PCM codec and coupleable to the digital communication network; and a switch coupled to the analog modem, to the PCM codec and to the analog interface circuit, the switch responsive to a control signal to selectively couple the analog modem to the analog interface circuit and to couple the analog modem to the PCM codec, whereby the data communication device is operable in the analog modem mode when the analog modem is coupled to the analog interface circuit, and whereby the data communication device is operable in the digital modem mode when the analog modem is coupled to the PCM codec.

Figure 9:
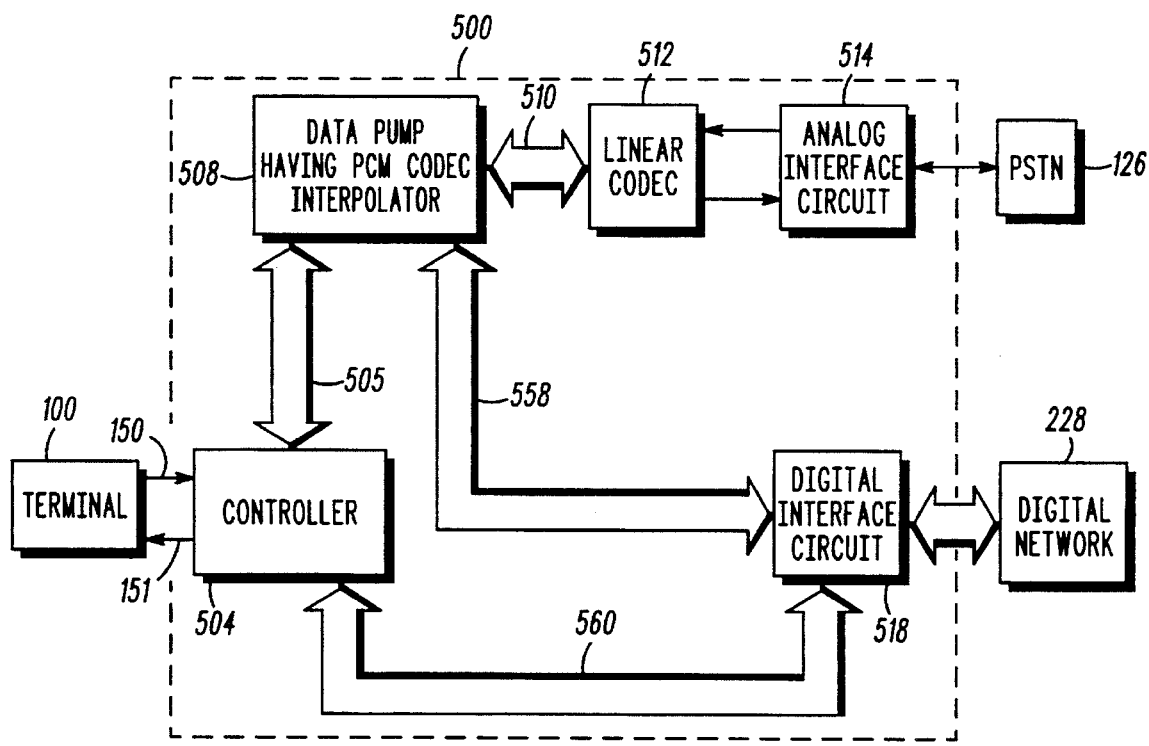
FIG. 9 is a block diagram which illustrates a third embodiment of the invention disclosed in related U.S. patent application Ser. No. 08/395,332 and incorporated herein.

FIG. 9 is a block diagram which illustrates a third embodiment of the invention disclosed in related U.S. patent application Ser. No. 08/395,332. The terminal 100 is coupleable to the data communications device 500, also via transmit and receive lines 150 and 151. Transmit and receive lines 150 and 151 are coupled to a controller 504. The controller 504 is coupled to data pump 508 via bus 505, and to the digital interface circuit 518 via bus 560. The data pump 508 contains a PCM codec interpolator, as described and claimed in U.S. Pat. No. 5,365,545, issued Nov. 15, 1994, entitled "Modem—Channel Bank Converter", incorporated by reference herein. Among other things, the PCM codec interpolator may convert sampled analog data, sampled at a rate of 9600 samples per second, to sampled digital data, sampled at a rate of 8000 samples per second. In response to a control signal, which may be transmitted from the terminal 100 through the controller 504, generated by the controller 504 or otherwise provided by the controller 504, the data pump 506 may generate a sampled analog data signal transmitted to the linear codec 512 via bus 510, or may generate a digital modem signal transmitted to the digital interface circuit 518 via bus 558. The linear codec 512 converts the sampled analog data signal to an analog modem signal, which is then transmitted to the analog interface circuit 514 for transmission over the PSTN. The digital interface circuit 518 processes the digital modem signal for transmission over the digital network.

In summary, FIG. 9 illustrates a data communications device selectively operable as an analog modem, as a digital modem, and as a terminal adapter, coupleable to a public switched telephone network and to a digital communication network, the data communications device comprising: a data pump, the data pump having a PCM codec interpolator; a linear codec coupled to the data pump; an analog interface circuit coupled to the linear codec and coupleable to the public switched telephone network; a digital interface circuit coupleable to the digital communication network; a controller coupled to the data pump and to the digital interface circuit, the controller selectively providing a first control signal to the data pump to selectively operate the data pump in an analog mode and engage the linear codec and the analog interface circuit, the controller further selectively providing a second control signal to the data pump to selectively operate the data pump in a digital mode and to engage the digital interface circuit, whereby the data communication device is operable as an analog modem when the data pump is in the analog mode, whereby the data communication device is operable as a digital modem when the data pump is in the digital mode, and whereby the data communication device is operable as a terminal adapter when the data pump is not in either the analog mode or in the digital mode.

As is evident from the various embodiments of the present invention discussed above, the data communication device disclosed herein constitutes a single, integrated device which is capable of configuring and reconfiguring for operation in a variety of modes, such as operating as an analog modem, as a digital modem, and as a terminal adapter, and is further capable of communicating data over a variety of types of otherwise incompatible analog and digital networks. As mentioned above, the prior art essentially required separate and independent devices or other hardware to provide for data communication over these various networks.

FIG. 10 is a block diagram which illustrates a prior art arrangement of an analog modem 152 coupled to an analog leased line 140, and further coupled to a telephone line 110 for auxiliary or dial back-up capability for data transfer over the PSTN 126. As shown in FIG. 10 a local terminal 100, such as a computer, is coupled to a local analog modem 152 via transmit and receive lines (or bus) 150. Such transmit and receive lines, for example, may be part of an RS 232 interface (and cable) typically employed to couple a computer to a modem. The local analog modem 152 is coupled via analog leased line 140 to a remote analog modem 108. The line 140 may be a standard (one or two twisted pairs) leased line which transmits an analog signal. The local analog modem 152 is also coupled via line 110 to the PSTN 126. The line 110 may be a standard (twisted pair) telephone line which transmits an analog signal. A remote terminal 106, which may also be a computer, is coupled to a remote analog modem 108 via transmit and receive lines 160. The remote analog modem 108 is coupled via the leased line 140 to the analog modem 152. The remote analog modem 108 is also coupled via line 120 to the PSTN 126. Line 120, like line 110, may also be a standard telephone line.

As indicated in FIG. 10, the local terminal 100 and local analog modem 152 are arranged to transfer data, information and other signals, between a remote terminal 106 having a remote analog modem 108, over the leased line 140. Data, including information and command signals, are transferred between the terminals and their respective analog modems over the various respective transmit and receive lines 150 and 160. Information from the terminal 100 is modulated and otherwise processed by the local analog modem 152 to form an analog modem signal transmitted over leased line 140 to the remote analog modem 108. The remote analog modem 108 demodulates the received analog modem signal and transmits the demodulated data to the remote terminal over line 160. Information from the remote analog modem 108 may also be transmitted to the local analog modem 152 using the same method operating in the opposite or reverse direction.

In the event of an interruption, disconnection, loss, equipment failure, or some other type of unsatisfactory performance involving the leased line 140, the local analog modem 152 and the remote analog modem 108 may be reconfigured for auxiliary, supplementary or other forms of dial back-up transmission through the PSTN 126. If for some reason the leased line is lost, such as equipment failure or other unintentional disconnection, the leased line analog modem 152 would automatically detect the loss of the leased line 140, and would automatically reconfigure and connect to the remote modem 108 using the PSTN 126, proceeding through the various connection and training protocols and sequences such as dialing, line probing, and handshaking. Information from the terminal 100 is then modulated and otherwise processed by the local analog modem 152 to form an analog modem signal transmitted to the PSTN 126 over line 110. The analog modem signal is then transferred to the remote analog modem 108 by the PSTN as an analog signal over line 120. Within the PSTN, the analog modem signal may be converted to a digital signal for transmission within the network, and reconverted to an analog modem signal for transmission over the analog lines 110 and 120. In the event that the leased line connection is once again available, functional or otherwise restored, the leased line analog modem 152 would automatically detect such restoration, would reconfigure for transfering data over the leased line 140, and would cease data transfer through the PSTN 126.

FIG. 11 is a block diagram which illustrates a prior art use of a digital modem 245, a local analog modem 152, and a switching mechanism 243 to provide digital data communications service with auxiliary or other back-up analog service. As shown in FIG. 11, a local terminal 100, such as computer, is coupled to a local digital modem 245 and to a local analog modem 152, via transmit and receive lines 240 and switch 243, with the switch 243 having contacts arranged for transferring the data to the digital modem 245 via line or bus 241, or to the local analog modem 152 via line or bus 242. Such transmit and receive lines 240, for example, may be part of a digital modem interface (and cable), comparable to the analog RS 232 interface, also typically employed to couple a computer to a digital modem. The local digital modem 245 is coupled via digital transmit and receive lines 244 to a digital network 228, which is further coupled to the PSTN 126. The digital transmit and receive lines 244 may be standard digital lines, such as T1, E1, or ISDN lines, which transmit a digital signal. The local analog modem 152 may also be coupled via telephone line 210 to the PSTN 126, or may be coupled directly to the remote analog modem 108 via leased line 212. Also as shown in FIG. 11, remote terminal 106, which may also be a computer, is coupled to a remote analog modem 108 via transmit and receive lines 160. As in FIG. 10, the remote analog modem 108 may be coupled via line 120 to the PSTN 126, or via leased line 212 to the local analog modem 152. Line 120 may also be a standard analog telephone line.

As indicated in FIG. 11, the local terminal 100 and local digital modem 245 are arranged to transfer data and other information and signals, between a remote terminal 106 having a remote modem 108, over the digital network 228 and the PSTN 126. Data, including information and command signals, are transferred between the terminals and their respective modems over the various transmit and receive lines 240, 241, 244, 120 and 160. Information from the local terminal 100 is first processed by the local digital modem 245 to form a modulated analog signal, which is then further encoded (for example, using a pulse code modulation (PCM) scheme having either a mu-law or an A-law compandor) to form a digital signal transmitted to the digital network 228 and further transmitted to the PSTN 126. The PSTN reconverts the digital signal to a modulated analog signal, which is then transferred to the remote modem 108 by the PSTN as an analog signal over line 120. The remote modem 108 demodulates the received modulated analog signal and transmits the demodulated data to the remote terminal 106 over line 160. Information from the remote modem 108 may also be transmitted to the local digital modem 245 using the same method operating in the opposite or reverse direction.

Similarly to the auxiliary or back-up situation discussed with reference to FIG. 10, in the event of an interruption, disconnection, loss, equipment failure, or some other type of unsatisfactory performance involving the digital network 228, then the switch 243 routes data and control signals to the local analog modem 152 for auxiliary, supplementary or other forms of dial back-up transmission through the PSTN 126. If for some reason the digital network 228 is unavailable due to, for example, equipment failure or other unintentional disconnection, the digital modem 245 would automatically detect the loss of the digital network 228, and provide an indication of such loss to the switch 243 and/or the terminal 100. The local analog modem 152 would automatically configure and connect to the remote modem 108 using the PSTN 126, proceeding through the various connection and training protocols and sequences such as dialing, line probing, and handshaking. Information from the terminal 100 is then modulated and otherwise processed by the local analog modem 152 to form an analog modem signal. The analog modem signal is then transmitted to the PSTN 126 over line 210 or to the remote analog modem 108 over leased line 212. If transmitted through the PSTN 126, the analog modem signal is then transferred to the remote analog modem 108 by the PSTN as an analog signal over line 120. In the event that the digital network connection is once again available, functional or otherwise restored, the digital modem 245 would automatically detect such restoration, would reconnect to the digital network 228, re-route the switch 243, and configure for transfering data over the digital network 228, and would thereby cease auxiliary data transfer through the PSTN 126 or leased line 212.

Figure 12:
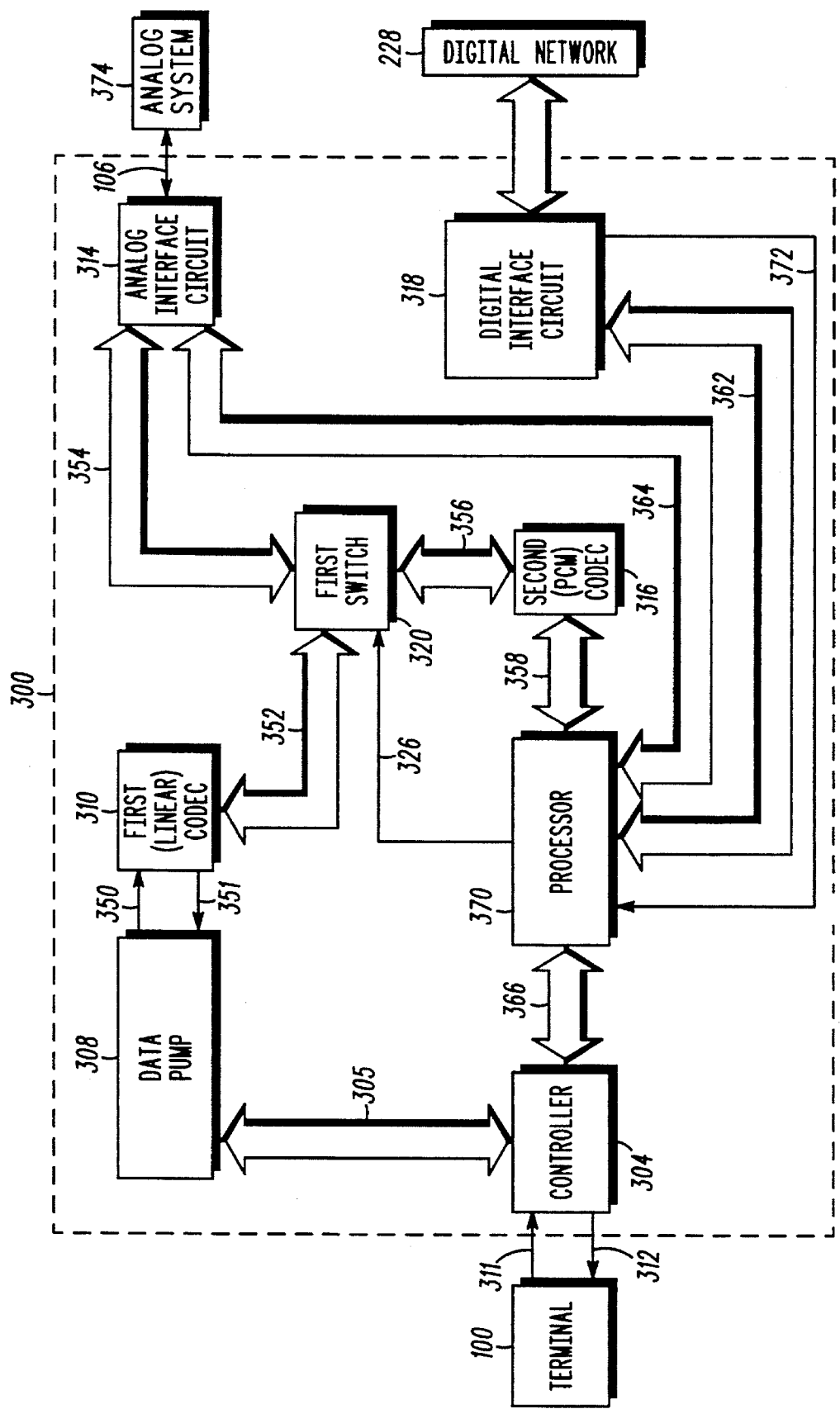
FIG. 12 is a block diagram which illustrates the prefered embodiment of the status signalling and auxiliary or back-up analog aspects of the present invention.

FIG. 12 is a block diagram illustrating the preferred embodiment of the present invention. As discussed above and as disclosed in the related U.S. application Ser. No. 08/395,332, the integrated data communication device of the preferred embodiment of the invention disclosed in that application may be selectively configured by the user to operate in any one of a plurality of operating modes, namely, as an analog modem, as a digital modem, or as a terminal adapter. In addition, after a first operating mode is selected, the data communication device of the preferred embodiment may be reconfigured by the user to operate in a second, third or otherwise different operating mode. The preferred embodiment of the present invention presupposes that the user has selectively configured the data communications device 300 for a digital operating mode, either as a digital modem or as a terminal adapter. The preferred embodiment of the present invention simultaneously provides for auxiliary, supplementary or other analog dial back-up service, over the PSTN or an analog leased line, for operating the data communications device as an analog modem in the event of an impairment of the digital network or channel.

As shown in FIG. 12, a data communication device 300 is coupleable to a terminal 100 to transmit and receive data over an analog system 374, such as the PSTN or analog leased line, when coupled to the PSTN or analog leased line through an analog interface circuit 314 (also known as a data access arrangement or "DAA"), and to transmit and receive data over the digital network 228, when coupled to the digital network 228 through a digital interface circuit 318. As discussed above with reference to FIG. 4, the user of the data communications device 300 may select the type of operating mode (as an analog modem, as a digital modem, or as a terminal adapter), through a plurality of user command signals entered via the user interface 301 (not shown in FIG. 12) coupled to the processor 370. With reference to FIG. 12, it is assumed that: first, the user has selected a digital operating mode, either as a digital modem or as a terminal adapter, as the primary operating mode, and has coupled the data communications device 300 to a digital network 228; and second, that the user has also coupled the data communications device 300 to an an analog system 374, such as the PSTN or analog leased line, to provide for auxiliary, secondary or back-up analog service in the event of a disruption of the digital network 228.

As shown in FIG. 12 (and in FIG. 4), the controller 304 is coupleable to the terminal 100 through transmit data line 311 and receive data line 312. The transmit and receive data lines 311 and 312 may be incorporated within any appropriate interface and cabling arrangement. The controller 304, which may be a Motorola 68302 microcontroller, is coupled via data bus 305 to a data pump 308, which may be a Motorola 56002 general digital signal processor programmed as a data pump. The data pump 308 receives data, command signals and other information from the controller 304, and the data pump 308 then generates a sampled data signal. The data pump 308 is also coupled via transmit line (or bus) 350 and receive line (or bus) 351 to a first codec 310. The first codec 310 is preferably a linear codec, and receives the sampled data signal from the data pump, typically at a sampling rate of 9600 samples per second, and then generates a modulated analog signal from the sampled data signal. The first or linear codec 310 is also known and may be implemented as an analog-to-digital (A/D) converter and digital-to-analog (D/A) converter. The modulated analog signal from the linear codec 310 is transmitted via line or bus 352 to the first switch 320. In the preferred embodiment, the first switch 320 is an analog switch, and may be implemented in any number of forms, such as a solid state or mechanical relay, or as a discrete transistor or integrated circuit arrangement (e.g., CMOS, BJT). The first switch 320 may also include a plurality of otherwise separate switching mechanisms, for example, to correspond to each separate data path of the data busses. The first switch 320, in turn, in response to a control signal transmitted via line 326, may route the modulated analog signal from the linear codec 310 to a first interface circuit, shown in FIG. 12 as the analog interface circuit 314, via bus 354, or may route the modulated analog signal to the second codec 316, shown in FIG. 12 as a preferably a non-linear PCM (pulse code modulation) codec 316, via bus 356.

Continuing to refer to FIG. 12, the processor 370 consists of a microprocessor, such as an Intel 8032, and digital switching circuits, such as a digital multiplexer ("MUX"), to form a programmable distributed switching mechanism. The processor 370 provides a control signal to the first switch 320 via line 326. In the preferred embodiment, the control signal has first and second values, such as a high voltage (a logic one (1)), and a low voltage (a logic zero (0)). The first switch 320, in response to the control signal having the first value, such as a high voltage, transmits the modulated analog signal from the linear codec 310 to the first (analog) interface circuit 314 via bus 354, and in response to the control signal having the second value, such as a low voltage, transmits the modulated analog signal to the non-linear PCM codec (or "PCM codec") 316 via bus 356. Alternatively, the control signal having two values may also be considered to be two signals and, in that event, may be considered first and second control signals. From the analog interface circuit 314, the modulated analog signal may then be transmitted via line 106 through the first communications network shown in FIG. 12 as an analog system 374, such as the PSTN or analog leased line, and in this mode, the data communications device 300 is operating in a first mode as an analog modem. As disclosed in reference to FIG. 4, the first interface circuit such as the analog interface circuit 314 would also typically provide a variety of functions, such as power level setting, impedance matching, and may include hybrid circuitry to transfer information from two sets of twisted pair transmission lines to one pair of transmission lines.

The processor 370 is further coupled to the second (PCM) codec 316 via bus 358, to the analog interface circuit 314 via bus 364, to the controller 304 via bus 366, and to the digital interface circuit 318 via bus 362 and via line 372. Alternatively, line 372 may also be incorporated as part of bus 362. In response to the control signal from the processor 370 having the second value, such as a low voltage, the first switch 320 transmits the modulated analog signal to the PCM codec 316. The PCM codec digitally encodes the modulated analog signal using a pulse code modulation scheme to provide a digital modem signal and, in this second operating mode, the data communication device is operating as a digital modem. The PCM codec 316 transmits the digital modem signal to the processor 370, which routes or transmits the the digital modem signal to the second interface circuit, shown in FIG. 12 as digital interface circuit 318, via bus 362. The second or digital interface circuit 318 is coupleable to a second communications network, shown in FIG. 12 as digital network 228, and processes the digital modem signal for transmission over the second (digital) network. For example, the digital interface circuit may act as a time division multiplexer to place the digital modem signal, having a DS0 format, in the appropriate digital channel or time slot.

The processor 370 also receives from and transmits to the controller 304, via bus 366, various data signals and control signals. In the event the data communication device 300 is to be operable in a third operating mode, as a terminal adapter, as determined by one of the plurality of user command signals from the user interface, the processor transmits a processor command signal to the controller via bus 366. In the third or terminal adapter mode, the controller processes digital information received from the terminal to form a digital information signal, and transmits the digital information signal to the processor 370 via bus 366. The processor 370, in turn, routes or transmits the digital information signal via bus 362 to the digital interface circuit 318 for transmission over the digital network 228. The digital interface circuit 318 also processes the digital information signal for transmission over the digital network, in a manner identical to the processing of a digital modem signal discussed above.

Continuing to refer to FIG. 12, when the data communications device 300 is configured and operating in a digital mode, the digital interface circuit 318 is responsive to or may otherwise detect the operating state of the digital network 228. In the preferred embodiment of the present invention, the digital interface circuit 318 may detect an interruption, impairment, loss, failure or other disruption of the digital network or digital carrier signal. For example, in the preferred embodiment, when coupled to a T1 line, the digital interface circuit 318 may detect the loss or absence of a T1 signal due to, for example, the absence of the frame sync bits. Under conditions of proper or typical operation of a T1 line, the frame sync bits would be transmitted from the digital network 228 both when data is being transmitted and when no data is being transmittted. Accordingly, the absence of the frame sync bits may be used to indicate or detect a problem within the digital network 228, such as an interruption, impairment, loss, failure or other disruption of the digital network or digital carrier. Under these circumstances of an absence of the expected digital carrier signal (such as frame sync bits), in the preferred embodiment of the present invention, the data communications device 300 will automatically reconfigure from a digital mode to an analog mode for auxiliary, secondary or back-up analog service. Correspondingly, in the preferred embodiment of the present invention, when the data communications device 300 has been operating in the auxiliary analog mode, upon resumption of proper operation of the digital network 228 indicated by, for example, the resumption of the expected digital carrier signal (such as frame sync bits), the data communications device 300 will automatically reconfigure from the auxiliary or back-up analog mode to a digital mode to resume operation in the selected, primary digital operating mode over the digital network 228.

Referring to FIG. 12, the digital interface circuit 318 provides a status signal to the processor 370 via line 372 or, alternatively, via bus 362. The status signal is representative of or otherwise indicates the operational state of the digital network 228 (or digital carrier). In the preferred embodiment of the present invention, the status signal is a negative logic "carrier alarm" signal. During normal or otherwise proper operation of the digital network 228, the status signal is maintained at a logic high, e.g., a high voltage. In the event of an impairment of the digital network 228 indicated, for example, by the loss of frame sync bits, the status signal changes state and transitions from a logic high to a logic low, e.g., a low voltage. Upon such a change of state of the status signal, transmitted to the processor 370, the processor may also further determine the duration or period of time of such change of state of the status signal, to avoid reconfiguring the data communications device 300 when such change of state may have been only fleeting or otherwise temporary. In the preferred embodiment of the present invention, the processor 370 continuously monitors the state of the status signal, and provides the control signals referred to above to reconfigure the data communications device 300 from the primary digital mode to the auxiliary analog mode (and, conversely, from the auxiliary analog mode to the primary digital mode) only when the change of state of the status signal has persisted for a certain duration, such as for one second or for ten seconds. For example, in the preferred embodiment, in the event that the status signal has transitioned from a logic high to a logic low and has remained at a logic low for one second, the processor 370 will provide a control signal to to the first switch 320 and the data communications device will reconfigure for operation as an analog modem, as discussed in detail above. Such reconfiguration for auxiliary analog service will occur automatically, seamlessly, and generally transparently to the user, without any intervention by the user (through, for example, the entry of a user command signal through the user interface 301). Once configured for auxiliary analog service, the data communications device 300 will operate as an analog modem and proceed through the various analog data communications protocols, including connecting (dialing), line probing, and handshaking (e.g. request to send, clear to send). Having configured for analog operation, the digital multiplexers referred to above will also be switched for operation in the analog mode, for example, for transmitting a ring signal from the analog system rather than for simulating a ring signal for digital operation.

Continuing to refer to FIG. 12, when the data communications device 300 has been configured for and is operating as an analog modem for back-up or auxiliary analog data transmission, the processor 370 performs a "look back" function and continues to monitor the state of the status signal, In the event that the status signal changes state and thereby indicates that the digital network 228 is no longer impaired, lost, interrupted or otherwise unavailable, the processor 370 will provide a control signal to the first switch 320 to configure (or reconfigure) for operation in a digital mode. Again, in the preferred embodiment of the present invention, the processor 370 will monitor the duration of the change of state of the status signal and, for example, will issue the command signal to reconfigure in a digital mode only when the status signal has returned to a logic high state for one second, rather than for a fleeting or temporary period. The configuration or reconfiguration for a digital operating mode would include, in the preferred embodiment, for example, switching the first switch 320 for data transmission through the second codec 316 for operation as a digital modem, simulation of off hook and ring signals, and the other items discussed in detail above. Alternatively, for reconfiguration as a terminal adapter, the processor 370 transmits a processor command signal to the controller 304, also as discussed in detail above in reference to FIG. 4. As was the case for the transition to auxiliary analog service, again, such reconfiguration back to primary digital service will occur automatically, seamlessly, and generally transparently to the user, without any intervention by the user (through, for example, the entry of a user command signal through the user interface 301). Once configured or reconfigured for primary digital service, the data communications device 300 will operate as a digital modem or terminal adapter and proceed through the various digital data communications protocols, including use of the digital interface signalling bits, such as the A and B signalling bits, also discussed in detail above.

While the preferred embodiment of the present invention illustrated in FIG. 12 has been described in detail with regard to information transmission, it will be understood by those skilled in the art that a similar analysis applies with regard to information reception. Accordingly, such data or information transmission and reception are generally referred to as data or information transfer to accomodate the bidirectional flow of data.

In summary, FIG. 12 illustrates a data communications device selectively operable in at least one of a plurality of operating modes, including a first operating mode and a second operating mode, the data communications device coupleable to a terminal and to at least two of a plurality of communications networks for transferring data between the terminal and one of the plurality of communications networks, including a first communications network and a second communications network, the data communications device comprising: a controller; a data pump coupled to the controller; a first codec coupled to the data pump; a second codec; a first interface circuit coupleable to the first communications network; a second interface circuit coupleable to the second communications network; a first switch coupled to the first codec, to the second codec and to the first interface circuit; and a processor coupled to the controller, to the second codec, to the first interface circuit, to the second interface circuit, and to the first switch, the processor responsive to a a status signal to selectively configure the data communications device for operation in the first operating mode for communications through the first communications network and for operation in the second operating mode for communications through the second communications network. The various first and second codecs may be linear or non-linear, and in the preferred embodiment, the first codec is a linear codec and the second codec is a non-linear PCM codec, having a mu-law or an A-law compandor. The first and second communications networks may be a PSTN, leased line, T1, E1, ISDN, or any other analog or digital communications networks.

Also illustrated in FIG. 12, the status signal may be provided by either or both the first and second interface circuits and, further, the status signal may be a carrier alarm, the status signal may have two values, such as a logic high (or a high voltage) and a logic low (or a low voltage). Alternatively, the status signal may comprise a plurality of distinguishable or identifiable signals and, in that event, may be considered or referred to as first, second, third, etc., identifiable signals. In addition, the processor may be further responsive to the duration of the status signal or the duration of the change of state of the status signal. FIG. 12 also illustrates a data communications device wherein the processor is further responsive to the duration of the status signal to selectively configure the data communications device for operation in the first operating mode for communications through the first communications network when the status signal has a first value maintained for a first duration and for operation in the second operating mode for communications through the second communications network when the status signal has a second value maintained for a second duration. In the preferred embodiment, the first and second durations are typically the same, for example, and may be in the range of one to ten seconds. This may also be described as the processor being further responsive to a duration of a change of state of the status signal from a first value to a second value, to selectively configure the data communications device for operation in the first operating mode for communications through the first communications network when the status signal has changed state from a first value to a second value, the second value maintained for a first period of time, and for operation in the second operating mode for communications through the second communications network when the second value of the status signal has not been maintained for the first period of time. In such circumstances, for example, the data communications device ("DCD") remains in the second or digital operating mode unless and until the status signal has both changed state, from a first value to a second value, such as high to low, and the status signal has remained at that second value for a predetermined or first period of time, such as one to ten seconds. Conversely, once in the auxiliary analog mode, the DCD will only reconfigure back to a digital mode when the status signal has again changed state from the second value back to the first value, for example, from low to high, and the status signal has remained at that first value for a predetermined, second period of time, which may or may not be the same duration as the first period of time. Accordingly, the processor may be further responsive to a duration of a change of state of the status signal from a second value to a first value, to selectively configure the data communications device for operation in the second operating mode for communications through the second communications network when the status signal has changed state from a second value to a first value, the first value maintained for a second period of time, and for operation in the first operating mode for communications through the first communications network when the first value of the status signal has not been maintained for the second period of time.

Moreover, in the data communications device illustrated in FIG. 12, the second interface circuit is responsive to a loss of a digital carrier signal or digital network signal to provide or produce a change of state of the status signal. In addition, the second interface circuit is responsive to a resumption of a digital carrier signal or digital network signal to provide or produce a change of state of the status signal. Also as disclosed with reference to FIG. 12, the status signal changes state in response to the operating state of the second communications network, typically the digital network. The operating state of the digital network would typically refer to the functionality of the network, such as whether it is functioning properly, or has been impaired, interrupted, disrupted, lost, or has otherwise failed to operate in some way. Accordingly, in the data communications device 300, the second interface circuit may be considered to be responsive to a disruption of a carrier signal of the second communications network to produce a change of state of the status signal, such as a loss of frame sync bits or other aspects of a T1 signal.

Accordingly, FIG. 12 also illustrates a data communications device wherein the first communications network is a public switched telephone network or analog leased line system, the second communications network is a digital communications network, the first interface circuit is an analog interface circuit, the second interface circuit is a digital interface circuit; and wherein the processor is responsive to a status signal to produce a first control signal to the first switch to selectively couple the first codec to the analog interface circuit and to couple the first codec to the second codec, whereby the data communications device is configured in an analog modem operating mode when the first codec is coupled to the analog interface circuit, and whereby the data communications device is configured in a digital modem operating mode when the first codec is coupled to the second codec. FIG. 12 further illustrates a data communications device wherein the processor is further responsive to a status signal to produce a second control signal to the controller whereby the data communications device is configured in a terminal adapter mode for the processor to transfer data through the digital interface circuit to the digital communications network. Also as shown in FIG. 4 and FIG. 12, the data communications device may further comprise an input port coupled to the processor and coupleable to a user interface for entry of at least one of the plurality of command signals.

In addition, the various operating combinations of the device may be described, for example, as a primary operating mode as a digital modem with an auxiliary operating mode as an analog modem. In that case, the embodiment may be described as a data communications device wherein: the first communications network is a public switched telephone network, the second communications network is a digital communications network, the first interface circuit is an analog interface circuit, the second interface circuit is a digital interface circuit; and wherein the processor is responsive to a first value of the status signal to produce a first control signal to the first switch to selectively couple the first codec to the analog interface circuit and further responsive to a second value of the status signal to produce a second control signal to the first switch to selectively to couple the first codec to the second codec, whereby the data communications device is configured in an analog modem operating mode when the first codec is coupled to the analog interface circuit, and whereby the data communications device is configured in a digital modem operating mode when the first codec is coupled to the second codec.

Similarly, the operating combination of the device may be described, for example, as a primary operating mode as a terminal adapter with an auxiliary operating mode as an analog modem. In that case, the embodiment may be described as a data communications device wherein: the first communications network is a public switched telephone network, the second communications network is a digital communications network, the first interface circuit is an analog interface circuit, the second interface circuit is a digital interface circuit; and wherein the processor is responsive to a first value of the status signal to produce a first control signal to the first switch to selectively couple the first codec to the analog interface circuit and further responsive to a second value of the status signal to produce a processor command signal to the controller to selectively to couple the controller to the processor for direct data transmission between the controller and the processor, whereby the data communications device is configured in an analog modem operating mode when the first codec is coupled to the analog interface circuit, and whereby the data communications device is configured in a terminal adapter operating mode when the controller is coupled to the processor for direct data transmission between the controller and the processor.

The various embodiments of the invention may also be described in other ways, such as a data communications device selectively configurable as an analog modem, as a digital modem, or as a terminal adapter, the selective configuration in response to at least one of a plurality of user command signals for configuration in a primary digital operating mode and an auxiliary analog operating mode, the data communications device coupleable to a terminal, to a public switched telephone network and to a digital communications network for transferring data between the terminal and one of the communications networks, the digital communications network having a digital carrier signal, the data communications device comprising: a controller; a data pump coupled to the controller; a first codec coupled to the data pump; a second codec; an analog interface circuit coupleable to the public switched telephone network; a digital interface circuit coupleable to the digital communications network, the digital interface circuit providing a status signal when coupled to the digital communications network, the status signal having a plurality of states including a first state and a second state, the digital interface circuit responsive to a disruption of the digital carrier signal to change a state of the status signal from the first state to the second state; a first switch coupled to the first codec, to the second codec and to the analog interface circuit, the first switch responsive to a control signal; and a processor coupled to the controller, to the second codec, to the analog interface circuit, to the digital interface circuit, and to the first switch, the processor responsive to a first user command signal from the plurality of user command signals to configure the data communication device in the primary digital operating mode as a terminal adapter and thereby transfer data from the controller through the digital interface circuit, the processor further responsive to a second user command signal to produce the control signal to the first switch to selectively couple the first codec to the analog interface circuit and to couple the first codec to the second codec, whereby the data communication device is configured in the auxiliary analog operating mode as an analog modem when the first codec is coupled to the analog interface circuit, and whereby the data communication device is also configured in the primary digital operating mode as a digital modem when the first codec is coupled to the second codec; the processor further responsive to the change of state of the status signal to selectively reconfigure the data communication device from the primary digital operating mode to the auxiliary analog operating mode. In addition, the processor may be further responsive to the change of state of the status signal to selectively reconfigure the data communication device from the auxiliary analog operating mode to the primary digital operating mode.

Also as discussed with reference to FIG. 4, the processor may further comprise: a distributed switch coupled to the first switch, the distributed switch providing a control signal to the first switch to selectively engage the analog interface circuit or the PCM codec; and a digital multiplexer coupled to the analog interface circuit and to the digital interface circuit to receive at least one of a plurality of information signals from the analog interlace circuit or the digital interface circuit, and to transmit at least one of the plurality of information signals to the analog interface circuit or to the digital interface circuit.

Figure 13:
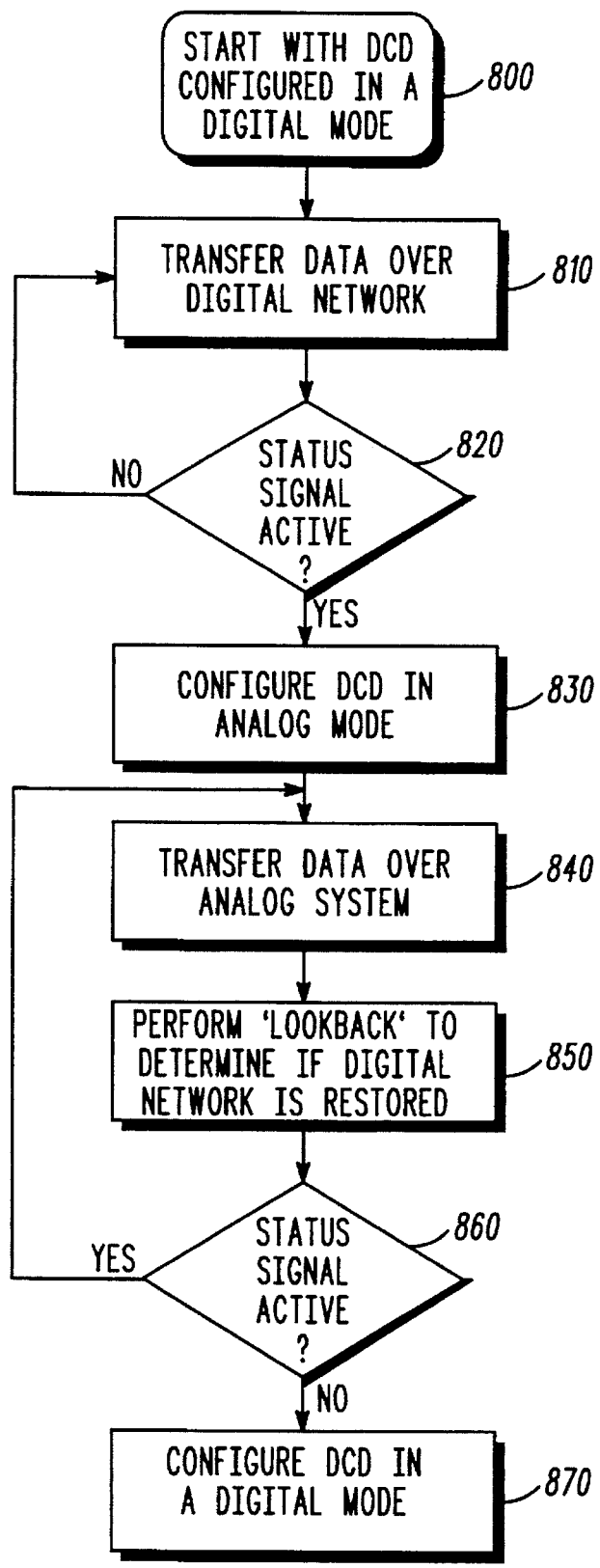
FIG. 13 is a flow chart which illustrates the status signalling and auxiliary or back-up analog aspects of the method of the prefered embodiment of the present invention.

FIG. 13 is a software flow diagram which illustrates the method of the preferred embodiment of the present invention. The method begins at start step 800, with the data communication device configured (through user command signals)in a digital mode, e.g., as a digital modem or as a terminal adapter. Data is transferred through the digital network, step 810, to the remote analog or digital modem or terminal adapter. If the status signal remains stable or inactive, i.e., the status signal does not change state, data continues to be tranferred over the digital network, step 820. For example, if the carrier alarm remains in a logic high state, data continues to be transferred via the digital modem or terminal adapter. Also in step 820, if the status signal does not remain stable and becomes active, i.e., the status signal changes state, the method proceeds to the next step, step 830. In the preferred embodiment, the method will proceed to step 830 only when the status signal has changed state and the changed state has persisted or continued for a predetermined minimum period, such as one second or ten seconds. For example, in the preferred embodiment, the status signal (or carrier alarm) changes state from a logic high to a logic low in the absence of frame sync bits or other aspects of, for example, a T1 signal, and the method proceeds to step 830.

In step 830, the data communication device reconfigures for operation in an analog mode, as an analog modem. The data communications device establishes a connection over the PSTN or analog leased line, proceeding with the various analog protocols. When the configuration, connection and protocols have been completed, data may be transferred over the PSTN or analog leased line, step 840. The data communication device monitors the digital network (or digital carrier) and determines if it has been restored satisfactorily, step 850. In the preferred embodiment, the data communication device monitors the resumption of the frame sync bits or other aspects of the resumption of, for example, a T1 signal. If the digital network has not been restored such that the status signal remains active, i.e., the status signal does not change state back to its normal or typical operating state, data continues to be transferred over the analog network, step 860. For example, if the carrier alarm remains in a logic low state, data continues to be transfered via the analog operating mode of the data communications device. Also in step 860, if the status signal does not remain stable and becomes inactive, i.e., the status signal changes state, the method proceeds to the next step, step 870. In the preferred embodiment, the method will proceed to step 870 only when the status signal has changed state and the changed state has persisted or continued for a predetermined minimum period, such as one second or ten seconds. For example, in the preferred embodiment, the status signal (or carrier alarm) changes state from a logic low to a logic high upon the resumption of or in the presence of frame sync bits or other aspects of, for example, a T1 signal, and the method proceeds to step 870. In step 870, the digital network having been restored, the data communications device reconfigures for operation in a digital mode, as a digital modem or as a terminal adapter. The data communication device establishes a connection over the digital network, proceeding with the various applicable digital protocols. When the configuration, connection and protocols have been completed, data may be transferred over the digital network, returning to step 810.

In summary, FIG. 13 illustrates a method of selectively operating a data communications device in at least one of a plurality of operating modes, including a primary digital operating mode and an auxiliary analog operating mode, the data communications device coupleable to a terminal and to at least one of a plurality of communications networks for transferring data between the terminal and one of the plurality of communications networks, including a digital communications network and an analog communications network, the method comprising: (a) operating the data communications device in the primary digital operating mode; (b) monitoring the state of the digital communications network; (c) generating a status signal responsive to the monitored state of the digital communications network; (d) reconfiguring the data communications device for operation in the auxiliary analog operating mode in response to a status signal indicating an impairment of the digital communications network; (e) operating the data communications device in the auxiliary analog operating mode provided that the status signal indicates an impairment of the digital communications network; and (f) reconfiguring the data communications device for operation in the primary digital operating mode and proceeding to step (a), provided that the status signal ceases to indicate an impairment of the digital communications network. In addition, step (b) further comprises monitoring the digital carrier signal of the digital communications network, and if the digital communications network is a T1 network, then the monitoring step (b) further comprises monitoring frame sync bits.

Also in summary of the method, step (c) above may further comprise: (c1) generating a status signal having a logic low value in response to an impairment of the digital communications network; (c2) maintaining the status signal at the logic low value for the duration of the impairment; and (c3) generating a status signal having a logic high value when the monitored state of the digital communications network indicates no impairment of the digital communications network. Step (d) may also further comprise: (d1) changing the state of the status signal in response to an impairment of the digital communications network; and (d2) reconfiguring the data communications device for operation in the auxiliary analog operating mode in response to the changed state of the status signal continuing for a first period of time. Step (f) also may further comprise: (f1) changing the state of the status signal in response to a cessation of an impairment of the digital communications network; and (f2) reconfiguring the data communications device for operation in the primary digital operating mode in response to the changed state of the status signal continuing for a second period of time. Steps (d) and (f) may further include providing a control signal to selectively engage the analog communication network or the digital communication network. In addition, step (a) may further comprise: (a1) simulating analog signalling information from received predetermined digital signalling information; and (a2) simulating digital signalling information for transmission from predetermined analog signalling information. Lastly, step (e) may further comprise establishing a data communications connection over the analog communications network, which also may include dialing, line probing, and training if the analog communications network is a public switched telephone network; and line probing and training if the analog communications network is a leased line connection.

As is evident from the various embodiments of the present invention discussed above, the data communication device disclosed herein constitutes a single, integrated device which is capable of configuring and reconfiguring for operation in a variety of modes, such as operating as an analog modem, as a digital modem, and as a terminal adapter, and is further capable of communicating data over a variety of types of otherwise incompatible analog and digital networks. As mentioned above, the prior art essentially required separate and independent devices or other hardware to provide for data communication over these various networks.

The novel data communication device of the invention of the related U.S. patent application Ser. No. 08/395,332 is the first such device to be convertable, reconfigurable, or "upgradeable" to meet the potentially changing requirements of the user. In addition, the data communication device may be converted or reconfigured to a different mode of operation without any hardware conversion, addition, or substitution, providing yet additional advantages. First, the data communication device may be configured or reconfigured remotely, through the user interface, which may have its own network capabilities. Accordingly, an installer or other service personnel may configure and/or reconfigure the data communication device from a remote location, for example, from a manufacturing facility located across the country.

Second, the data communication device hardware is convertable and upgradeable, such that a user's current investment in data communications equipment may be preserved notwithstanding network changes. For example, a user's current needs may indicate continued use of a PSTN for data networking. The data communications device of the present invention would provide for the user to currently connect its data communications equipment through the PSTN, while simultaneously providing for future connection to digital networks through the same hardware, preserving the user's current equipment investment while providing for upgradeability in the future. When this upgradable data communication device according to the present invention is used in a digital or an analog network system, it is possible to make a heretofore unavailable effortless transition between the analog network and the digital network.

Third, because the data communications device disclosed herein is capable of combining three separate devices into one integrated, fully functioning device, the data communications device disclosed herein provides for power conservation, as fewer devices are required, and accordingly, fewer devices are required to be powered at any given time. In addition, because the single, integrated data communications device disclosed herein performs the functions of three heretofore separate devices, the data communications device of the present invention significantly reduces the number of devices required at a network installation and may significantly reduce the housing and other space requirements of the network facility.

Fourth, the novel device of the preferred embodiment of the present invention is the first such single, fully integrated data communications device capable of providing primary data communications over a digital network, while simultaneously providing for auxiliary or secondary data communications over an analog network in the event of impairment of the digital network. When this integrated data communications device according to the present invention is used in a primary digital network and a secondary analog network system, it is possible to make a heretofore unavailable seamless and effortless transition between the analog network and the digital network, for example, for the analog network to provide back-up support for the digital network. The novel data communication device of the present invention is the first such device to be convertable or reconfigurable to meet the needs of providing analog back-up for a digital network, previously available in only a leased line type of service. In addition, the data communication device may be converted or reconfigured to a different mode of operation without any hardware conversion, addition, or substitution, providing yet additional advantages when used in a systems enviroment such as the Motorola DAS 925.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

APPENDIX A 02-28-1995 09:16    430 8499            UDS ENGINEERING            P.02

*UD094058  S1*
*Signaling Module*

```
/*&&&& srb
    Program modified 2/10/95 to fit DHM
*/
#pragma SB OT(5) NOIV DB CD PL(60)
```

*Simulator signals*

```
/*******************************************************************/
/* Filename: SIGNAL.C                                       */
/*                                                          */
/* Description: This file contains the signaling routine for each   */
/*        modem.                                            */
/*                                                          */
/* Programmer: Tim Pearson                                  */
/*         8820/091                                         */
/*                                                          */
/* COPYRIGHT:  Copyright 1994,1995 by Motorola/ISG Transmission Products */
/*        All rights reserved.                              */
/*                                                          */
/*******************************************************************/
#include "dmdp.h"
#include <intrins.h>
#include <absacc.h>
#include "rux51.h"
#include "LVWDEF.H"

define SIGNAL_RBANK 3 sbit BSIG = ACC^2;
sbit ASIG = ACC^0;

#define RING_TOGGLE  8    /* 8*3=24ms - ring period is 48 ms (21 hz)  */
#define RING_ON_TIME 82   /* 2 second (82 * 24 ms)   */
#define RING_OFF_TIME 164 /* 4 second (164 * 24 ms)  */
/* #define dev_idx    0    /* hardcode to device #1   */
bit flag_sig_a,ring_on_flag_a;
uchar data count_sig_a,timer_sig_a,ring_timer_a,ring_on_time_a;
bit flag_sig_b,ring_on_flag_b;
uchar data count_sig_b,timer_sig_b,ring_timer_b,ring_on_time_b;
extern xdata Modem Devices[]; /* array of structures of devices of type modem */ enum trunk_signaling_state {
    T_IDLE,
    T_OFF_HOOK,
    T_WINK,
    T_DELAY,
    T_ALERT1,
    T_ALERT2,
    T_ALERT3,
    T_ON_LINE,
    T_HANG_UP,
    T_DISCONNECT
};
bit ring_enable_a,on_hook_a,prev_on_hook_a,line_current_a;
UChar data rx_ab[2],tx_ab[2],valid_rab[2];
```

```
UChar data current_rab_a,rab_count_a,trunk_state_a;
bit ring_enable_b,on_hook_b,prev_on_hook_b,line_current_b;
UChar data current_rab_b,rab_count_b,trunk_state_b;
UChar data busy_out[2],was_leased[2];
UChar data dev_idx;

extern bit DEVA_LAL,DEVB_LAL,DEVA_OH,DEVB_OH,super_frame;
/*&&&& 2/10/95 srb */
/*extern xdata device_regs IO[4];*/
/*&&&&*/
extern UChar DEVICE_AB_CTRL_COPY;

bit incoming_call_1,incoming_call_2;

void signal_isr() interrupt 3 using SIGNAL_RBANK
{
 void status_check_a(void);
 void status_check_b(void);
 void trunk_signaling_a(void);
 void do_loop_signaling_a(void);
 void run_timers_a(void);
 uchar handle_dial_signaling_a(void);
 void handle_lease_signaling_a(void);
 void trunk_signaling_b(void);
 void do_loop_signaling_b(void);
 void run_timers_b(void);
 uchar handle_dial_signaling_b(void);
 void handle_lease_signaling_b(void);

TH1 = 0xF6;
 TL1 = 0x6B;

if (dev_idx == DEV_A)              /*                   */
 {
  status_check_a();    /* update OFF_HOOK and AL and DTE bits   */ run_timers_a();      /* run any required timers now */ if ((((Devices[DEV_A].Active_S_Regs[27] & 0x04) == 0x04) ||
   (busy_out[DEV_A] == 1))
     handle_lease_signaling_a();
  else
  {
   if (handle_dial_signaling_a()) {    /*             */
    if ((Devices[DEV_A].Option_Bits & 0x02) == 0x02)
     trunk_signaling_a();
    else
     do_loop_signaling_a();            /*             */
   }
  }                                     /*             */
  dev_idx = DEV_B;
 }
 else
 {
```

```c
    status_check_a();       /* update OFF_HOOK and AL and DTE bits      */ run_timers_b();         /* run any required timers now */ if (((Devices[DEV_B].Active_S_Regs[27] & 0x04) == 0x04) ||
        (busy_out[DEV_B] == 1))
        handle_lease_signaling_b();
    else
    {
        if (handle_dial_signaling_b()) {        /*                      */
            if ((Devices[DEV_B].Option_Bits & 0x02) == 0x02)
                trunk_signaling_b();
            else
                do_loop_signaling_b();          /*                      */
        }
    }                                           /*                      */
    dev_idx = DEV_A;
}
}                                               /*                      */

/**************************************************************************/
/*      status_check()                                                    */
/*      This module checks the current hardware bits to see if they have  */
/*      changed states.                                                   */
/**************************************************************************/
void status_check_a(void) using SIGNAL_RBANK {
/*&&&& srb 2/10/95 */
if ((DEVICE_A_STATUS & LAL_A) != 0) {
/*&&&&*/
    DEVA_LAL = 0;       /* LAL is off*/
} else {
    DEVA_LAL = 1;       /* LAL is on */
}

/*&&&& srb 2/10/95 */
if ((DEVICE_A_STATUS & OFF_HOOK_A) != 0) {
/*&&&&*/
    on_hook_a = 1;
    DEVA_OH = 0;        /* modem A is ON HOOK               */
} else {
    on_hook_a = 0;
    DEVA_OH = 1;        /* modem A is OFF HOOK              */
} if (line_current_a) {   /* see if line current needs is active */
    DEVICE_AB_CTRL_COPY &= ~(LNC_A);    /* line current     */
} else {
    DEVICE_AB_CTRL_COPY |= LNC_A;   /* no line current      */
}
DEVICE_AB_CTRL = DEVICE_AB_CTRL_COPY;

}
```

```
void status_check_b(void) using SIGNAL_RBANK {
/*&&&& srb 2/10/95 */
if ((DEVICE_B_STATUS & LAL_B) != 0) {
/*&&&&*/
   DEVB_LAL = 0;      /* LAL is off*/
} else {
   DEVB_LAL = 1;      /* LAL is on */
}

/*&&&& srb 2/10/95 */
if ((DEVICE_B_STATUS & OFF_HOOK_B) != 0) {
/*&&&&*/
   on_hook_b = 1;
   DEVB_OH = 0;       /* modem B is ON HOOK         */
} else {
   on_hook_b = 0;
   DEVB_OH = 1;       /* modem B is OFF HOOK        */
} if (line_current_b) {     /* see if line current needs is active */
   DEVICE_AB_CTRL_COPY &= ~(LNC_B);      /* line current           */
} else {
   DEVICE_AB_CTRL_COPY |= LNC_B;  /* no line current              */
}
DEVICE_AB_CTRL = DEVICE_AB_CTRL_COPY;

}

/*****************************************************/
/* run timers routines                              */
/*                                                  */
/* flag_sig is an (n*3) ms timer. To use, load time_sig */
/* with n-1 and set flag_sig to 0.                  */
/*****************************************************/ void run_timers_a(void) using SIGNAL_RBANK
{
      if (!flag_sig_a)
      {
            if (timer_sig_a != 0)
            {
               timer_sig_a--;
               if (timer_sig_a == 0)
               {
                     flag_sig_a = 1;
               }
            }
      } if (ring_enable_a)
      {
            if (ring_timer_a != 0)
               ring_timer_a--;
```

```
        else
        {
         ring_timer_a = RING_TOGGLE;
         if (ring_on_flag_a)
         {
          DEVICE_AB_CTRL_COPY ^= RING_A; /* XOR with ring bit */
          DEVICE_AB_CTRL = DEVICE_AB_CTRL_COPY;

if (ring_on_time_a != 0)
           ring_on_time_a--;
          else
          {
              ring_on_flag_a = 0;
              ring_on_time_a = RING_OFF_TIME;
          }
         }
         else
         {
          DEVICE_AB_CTRL_COPY |= RING_A; /* no ring */
          DEVICE_AB_CTRL = DEVICE_AB_CTRL_COPY;

if (ring_on_time_a != 0)
           ring_on_time_a--;
          else
          {
              ring_on_flag_a = 1;
              ring_on_time_a = RING_ON_TIME;
          }
         }
        }
    }
    else
    {
         DEVICE_AB_CTRL_COPY |= RING_A; /* no ring */
         DEVICE_AB_CTRL = DEVICE_AB_CTRL_COPY;
    }
} void run_timers_b(void) using SIGNAL_RBANK
{
    if (!flag_sig_b)
    {
        if (timer_sig_b != 0)
        {
         timer_sig_b--;
         if (timer_sig_b == 0)
         {
             flag_sig_b = 1;
         }
        }
    } if (ring_enable_b)
    {
```

```
                    if (ring_timer_b != 0)
                     ring_timer_b--;
                    else
                    {
                     ring_timer_b = RING_TOGGLE;
                     if (ring_on_flag_b)
                     {
                      DEVICE_AB_CTRL_COPY ^= RING_B; /* XOR with ring bit */
                      DEVICE_AB_CTRL = DEVICE_AB_CTRL_COPY;

if (ring_on_time_b != 0)
                       ring_on_time_b--;
                      else
                      {
                          ring_on_flag_b = 0;
                          ring_on_time_b = RING_OFF_TIME;
                      }
                     }
                     else
                     {
                      DEVICE_AB_CTRL_COPY |= RING_B; /* no ring */
                      DEVICE_AB_CTRL = DEVICE_AB_CTRL_COPY;

if (ring_on_time_b != 0)
                       ring_on_time_b--;
                      else
                      {
                          ring_on_flag_b = 1;
                          ring_on_time_b = RING_ON_TIME;
                      }
                     }
                    }
               }
               else
               {
                    DEVICE_AB_CTRL_COPY |= RING_B; /* no ring */
                    DEVICE_AB_CTRL = DEVICE_AB_CTRL_COPY;
               }
         }
/*****************************************************************/ void goto_idle_a(void) {
  trunk_state_a = T_IDLE;
  tx_ab[DEV_A] = 0x83;       /* ON HOOK                  */
  QCC_SIG[DEV_A] = tx_ab[DEV_A];
  timer_sig_a = 0;
  flag_sig_a = 0; /* don't run timer here */
  ring_enable_a = 0; /*   no ring                */
  line_current_a = 0; /* no line current          */
} void goto_off_hook_a(void) {
  trunk_state_a = T_OFF_HOOK;
```

```
tx_ab[DEV_A] = 0x8f;        /* OFF HOOK            */
QCC.SIG[DEV_A] = tx_ab[DEV_A];
timer_sig_a = 0;
flag_sig_a = 0; /* don't run timer here */
ring_enable_a = 0; /*   no ring             */
line_current_a = 1; /* line current         */
} void goto_wink_a(void) {
  trunk_state_a = T_WINK;
  tx_ab[DEV_A] = 0x8f;        /* OFF HOOK           */
  QCC.SIG[DEV_A] = tx_ab[DEV_A];
  timer_sig_a = 100;     /* 100*3 = 300ms timer     */
  flag_sig_a = 0;   /* clear timer done flag */
  ring_enable_a = 0; /*   no ring            */
  line_current_a = 1; /* line current        */
} void goto_delay_a(void) {
  trunk_state_a = T_DELAY;
  tx_ab[DEV_A] = 0x83;        /* STAY ON HOOK       */
  QCC.SIG[DEV_A] = tx_ab[DEV_A];
  timer_sig_a = 58;      /* 58*3 = 174ms timer      */
  flag_sig_a = 0;   /* clear timer done flag */
  ring_enable_a = 0; /*   no ring            */
  line_current_a = 0; /* no line current     */
} void goto_alert1_a(void) {
  trunk_state_a = T_ALERT1;
  tx_ab[DEV_A] = 0x8f;        /* send a wink        */
  QCC.SIG[DEV_A] = tx_ab[DEV_A];
  timer_sig_a = 67;      /* 67*3 = 201ms timer      */
  flag_sig_a = 0;   /* clear timer done flag */
  ring_enable_a = 0; /*   no ring            */
  line_current_a = 0; /* no line current     */
} void goto_alert2_a(void) {
  trunk_state_a = T_ALERT2;
  tx_ab[DEV_A] = 0x83;        /* SEND A WINK OFF    */
  QCC.SIG[DEV_A] = tx_ab[DEV_A];
  timer_sig_a = 8; /* restart 24 ms timer */
  flag_sig_a = 0;   /* clear timer done flag */
  ring_enable_a = 0; /*   no ring            */
  line_current_a = 0; /* no line current     */
} void goto_alert3_a(void) {
  trunk_state_a = T_ALERT3;
  tx_ab[DEV_A] = 0x83;        /* NOW RING THE PHONE */
  QCC.SIG[DEV_A] = tx_ab[DEV_A];
  timer_sig_a = 0;
  flag_sig_a = 0; /* don't run timer here */
```

```
ring_timer_a = 0;
ring_on_flag_a = 0;
ring_on_time_a = 0;
ring_enable_a = 1; /* ring                    */
line_current_a = 0; /* no line current        */
} void goto_on_line_a(void) {
  trunk_state_a = T_ON_LINE;
  tx_ab[DEV_A] = 0x8f;            /* OFF HOOK    */
  QCC.SIG[DEV_A] = tx_ab[DEV_A];
  timer_sig_a = 0;
  flag_sig_a = 0; /* don't run timer here */
  ring_enable_a = 0; /*    no ring          */
  line_current_a = 1; /* line current       */
} void goto_hang_up_a(void) {
  trunk_state_a = T_HANG_UP;
  tx_ab[DEV_A] = 0x83;            /* ON HOOK     */
  QCC.SIG[DEV_A] = tx_ab[DEV_A];
  timer_sig_a = 0;
  flag_sig_a = 0; /* don't run timer here */
  ring_enable_a = 0; /*   no ring           */
  line_current_a = 0; /* no line current    */
} void goto_disconnect_a(void) {
  trunk_state_a = T_DISCONNECT;
  tx_ab[DEV_A] = 0x8f;            /* OFF HOOK    */
  QCC.SIG[DEV_A] = tx_ab[DEV_A];
  timer_sig_a = 0;
  flag_sig_a = 0; /* don't run timer here */
  ring_enable_a = 0; /*   no ring           */
  line_current_a = 0; /* no line current    */
} void trunk_signaling_a(void) {
  valid_rab[DEV_A] &= 0x02;
  was_leased[DEV_A] = 0;
  switch(trunk_state_a) {
    case T_IDLE: /* T_IDLE              */
      if (!on_hook_a) {
        goto_off_hook_a();
      }
      else if (valid_rab[DEV_A] == 2) {
        if ((Devices[DEV_A].Option_Bits & 3) == 3) /* if wink start... */
          goto_delay_a();
        else
          goto_alert3_a();
      } else {
        goto_idle_a();
      }
```

```
        break;
    case T_OFF_HOOK:
        if (on_hook_a) {
            goto_idle_a();
        } else if (valid_rab[DEV_A] == 2) {
            goto_wink_a();
        }
        break;

case T_WINK:
        if (on_hook_a) {
            goto_idle_a();
        } else if (flag_sig_a) {
            goto_on_line_a();
        } else if (valid_rab[DEV_A] == 0) {
            goto_off_hook_a();
        }
        break;

case T_DELAY:
        if (valid_rab[DEV_A] == 0) {
            goto_idle_a();
        } else if (flag_sig_a) {
            goto_alert1_a();
        }
        break;

case T_ALERT1:
        if (valid_rab[DEV_A] == 0) {
            goto_idle_a();
        } else if (flag_sig_a) {
            count_sig_a = Devices[DEV_A].Wink_Dly;    /* wink delay timer */
            goto_alert2_a();
        }
        break;

case T_ALERT2:
        if (valid_rab[DEV_A] == 0) {
            goto_idle_a();
        } else if (flag_sig_a) {
            if (count_sig_a != 0)
                count_sig_a--;
            else
                goto_alert3_a();
        }
        break;

case T_ALERT3:
        if (valid_rab[DEV_A] == 0) {
            goto_idle_a();
        } else if (!on_hook_a) {
            goto_on_line_a();
        }
```

02-28-1995 09:18    430 8499         UDS ENGINEERING              P.11

_S10_

```
      break;

case T_ON_LINE:
      if (on_hook_a) {
         goto_hang_up_a();
      } else if (valid_rab[DEV_A] == 0) {
         goto_disconnect_a();
      }
      break;

case T_HANG_UP:
      if (!on_hook_a) {
         goto_on_line_a();
      } else if (valid_rab[DEV_A] == 0) {
         goto_idle_a();
      }
      break;

case T_DISCONNECT:
      if (on_hook_a) {
         goto_idle_a();
      } else if (valid_rab[DEV_A] == 2) {
         goto_on_line_a();
      }
      break;

}
} void goto_idle_b(void) {
   trunk_state_b = T_IDLE;
   tx_ab[DEV_B] = 0x83;         /* ON HOOK          */
   QCC.SIG[DEV_B] = tx_ab[DEV_B];
   timer_sig_b = 0;
   flag_sig_b = 0; /* don't run timer here */
   ring_enable_b = 0; /*   no ring             */
   line_current_b = 0; /* no line current       */
} void goto_off_hook_b(void) {
   trunk_state_b = T_OFF_HOOK;
   tx_ab[DEV_B] = 0x8f;         /* OFF HOOK         */
   QCC.SIG[DEV_B] = tx_ab[DEV_B];
   timer_sig_b = 0;
   flag_sig_b = 0; /* don't run timer here */
   ring_enable_b = 0; /*   no ring             */
   line_current_b = 1; /* line current          */
} void goto_wink_b(void) {
   trunk_state_b = T_WINK;
   tx_ab[DEV_B] = 0x8f;         /* OFF HOOK         */
   QCC.SIG[DEV_B] = tx_ab[DEV_B];
```

```
    timer_sig_b = 100;    /* 100*3 = 300ms timer        */
    flag_sig_b = 0;       /* clear timer done flag */
    ring_enable_b = 0;    /* no ring                    */
    line_current_b = 1;   /* line current              */
} void goto_delay_b(void) {
    trunk_state_b = T_DELAY;
    tx_ab[DEV_B] = 0x83;              /* STAY ON HOOK              */
    QCC.SIG[DEV_B] = tx_ab[DEV_B];
    timer_sig_b = 58;     /* 58*3 = 174ms timer          */
    flag_sig_b = 0;       /* clear timer done flag */
    ring_enable_b = 0;    /* no ring                    */
    line_current_b = 0;   /* no line current           */
} void goto_alert1_b(void) {
    trunk_state_b = T_ALERT1;
    tx_ab[DEV_B] = 0x8f;              /* send a wink               */
    QCC.SIG[DEV_B] = tx_ab[DEV_B];
    timer_sig_b = 67;     /* 67*3 = 201ms timer          */
    flag_sig_b = 0;       /* clear timer done flag */
    ring_enable_b = 0;    /* no ring                    */
    line_current_b = 0;   /* no line current           */
} void goto_alert2_b(void) {
    trunk_state_b = T_ALERT2;
    tx_ab[DEV_B] = 0x83;              /* SEND A WINK OFF           */
    QCC.SIG[DEV_B] = tx_ab[DEV_B];
    timer_sig_b = 8;      /* restart 24 ms timer */
    flag_sig_b = 0;       /* clear timer done flag */
    ring_enable_b = 0;    /* no ring                    */
    line_current_b = 0;   /* no line current           */
} void goto_alert3_b(void) {
    trunk_state_b = T_ALERT3;
    tx_ab[DEV_B] = 0x83;              /* NOW RING THE PHONE */
    QCC.SIG[DEV_B] = tx_ab[DEV_B];
    timer_sig_b = 0;
    flag_sig_b = 0;       /* don't run timer here */
    ring_timer_b = 0;
    ring_on_flag_b = 0;
    ring_on_time_b = 0;
    ring_enable_b = 1;    /* ring                       */
    line_current_b = 0;   /* no line current           */
} void goto_on_line_b(void) {
    trunk_state_b = T_ON_LINE;
    tx_ab[DEV_B] = 0x8f;              /* OFF HOOK                  */
    QCC.SIG[DEV_B] = tx_ab[DEV_B];
    timer_sig_b = 0;
```

```
    flag_sig_b = 0; /* don't run timer here */
    ring_enable_b = 0; /*   no ring              */
    line_current_b = 1; /* line current          */
} void goto_hang_up_b(void) {
    trunk_state_b = T_HANG_UP;
    tx_ab[DEV_B] = 0x83;        /* ON HOOK       */
    QCC.SIG[DEV_B] = tx_ab[DEV_B];
    timer_sig_b = 0;
    flag_sig_b = 0; /* don't run timer here */
    ring_enable_b = 0; /*   no ring              */
    line_current_b = 0; /* no line current       */
} void goto_disconnect_b(void) {
    trunk_state_b = T_DISCONNECT;
    tx_ab[DEV_B] = 0x8f;        /* OFF HOOK      */
    QCC.SIG[DEV_B] = tx_ab[DEV_B];
    timer_sig_b = 0;
    flag_sig_b = 0; /* don't run timer here */
    ring_enable_b = 0; /*   no ring              */
    line_current_b = 0; /* no line current       */
} void trunk_signaling_b(void) {
    valid_rab[DEV_B] &= 0x02;
    was_leased[DEV_B] = 0;
    switch(trunk_state_b) {
    case T_IDLE: /* T_IDLE            */
        if (!on_hook_b) {
            goto_off_hook_b();
        }
        else if (valid_rab[DEV_B] == 2) {
            if ((Devices[DEV_B].Option_Bits & 3) == 3) /* if wink start... */
                goto_delay_b();
            else
                goto_alert3_b();
        } else {
            goto_idle_b();
        }
        break;
    case T_OFF_HOOK:
        if (on_hook_b) {
            goto_idle_b();
        } else if (valid_rab[DEV_B] == 2) {
            goto_wink_b();
        }
        break;

case T_WINK:
        if (on_hook_b) {
            goto_idle_b();
```

```
} else if (flag_sig_b) {
  goto_on_line_b();
} else if (valid_rab[DEV_B] == 0) {
  goto_off_hook_b();
}
break;

case T_DELAY:
 if (valid_rab[DEV_B] == 0) {
   goto_idle_b();
 } else if (flag_sig_b) {
   goto_alert1_b();
 }
 break;

case T_ALERT1:
 if (valid_rab[DEV_B] == 0) {
   goto_idle_b();
 } else if (flag_sig_b) {
     count_sig_b = Devices[DEV_B].Wink_Dly;    /* wink delay timer
     */
   goto_alert2_b();
  }
 break;

case T_ALERT2:
 if (valid_rab[DEV_B] == 0) {
   goto_idle_b();
 } else if (flag_sig_b) {
     if (count_sig_b != 0)
       count_sig_b--;
     else
       goto_alert3_b();
  }
 break;

case T_ALERT3:
 if (valid_rab[DEV_B] == 0) {
   goto_idle_b();
 } else if (!on_hook_b) {
     goto_on_line_b();
 }
 break;

case T_ON_LINE:
 if (on_hook_b) {
   goto_hang_up_b();
 } else if (valid_rab[DEV_B] == 0) {
   goto_disconnect_b();
 }
 break;

case T_HANG_UP:
 if (!on_hook_b) {
```

```
     goto_on_line_b();
    } else if (valid_rab[DEV_B] == 0) {
     goto_idle_b();
    }
    break;

case T_DISCONNECT:
   if (on_hook_b) {
     goto_idle_b();
   } else if (valid_rab[DEV_B] == 2) {
     goto_on_line_b();
   }
   break;

}
}
/*******************************************************************/ void handle_lease_signaling_a(void) using SIGNAL_RBANK {
  tx_ab[DEV_A] = 0x8f;  /* send loop closure, robbed bit signaling */
  QCC.SIG[DEV_A] = tx_ab[DEV_A];
  timer_sig_a = 0;
  flag_sig_a = 0; /* don't run timer here */
  ring_enable_a = 0; /* no ring          */
  line_current_a = 0; /* no line current */
  was_leased[DEV_A] = 1;

} void handle_lease_signaling_b(void) using SIGNAL_RBANK {
  tx_ab[DEV_B] = 0x8f;  /* send loop closure, robbed bit signaling */
  QCC.SIG[DEV_B] = tx_ab[DEV_B];
  timer_sig_b = 0;
  flag_sig_b = 0; /* don't run timer here */
  ring_enable_b = 0; /* no ring          */
  line_current_b = 0; /* no line current */
  was_leased[DEV_B] = 1;

}

/*******************************************************************/
/*      do_loop_signaling()                                        */
/*      This module performs the loop/ground start signaling state */
/*      machine.                                                   */
/*      input - valid_rab[device] = XXXX ABCD                      */
/*      output - valid_rab[device] = XXXX X(B)(A)(HS)              */
/*          where B = B signaling bit                              */
/*                A = A signaling bit                              */
/*                HS = HOOK SWITCH (on hook = 1, off hook = 0)     */
/*******************************************************************/
void do_loop_signaling_a(void) using SIGNAL_RBANK {
  uchar temp;
```

```
was_leased[DEV_A] = 0;
timer_sig_a = 0;
flag_sig_a = 0; /* don't run timer here */
temp = (valid_rab[DEV_A] << 1) | on_hook_a;
/* ACC = xxxx xB-A-HS                           */ switch(temp) {
case 0:                     /* END OF RING                 */
    tx_ab[DEV_A] = 0x8f;    /* send loop closure       */
    QCC.SIG[DEV_A] = tx_ab[DEV_A];
/*  send_tone_1 = 0;        /*                           */
    ring_enable_a = 0; /* no ring                    */
    line_current_a = 1; /* line current present       */
    break;

case 01:                    /* ON HOOK, RING              */
    tx_ab[DEV_A] = 0x87;    /* send loop open          */
    QCC.SIG[DEV_A] = tx_ab[DEV_A];
    ring_timer_a = 0;
    ring_on_flag_a = 0;
    ring_on_time_a = 0;
    ring_enable_a = 1; /* ring                         */
    line_current_a = 0; /* no line current             */
    break;

case 02:                    /* NO TIP GROUND, OFF HOOK */
    tx_ab[DEV_A] = 0x83;    /* send ring ground        */
    QCC.SIG[DEV_A] = tx_ab[DEV_A];
    ring_enable_a = 0; /* no ring                     */
    line_current_a = 0; /* no line current            */
    break;

case 03:                    /* NO TIP GROUND, ON HOOK  */
    tx_ab[DEV_A] = 0x87;    /* send loop open          */
    QCC.SIG[DEV_A] = tx_ab[DEV_A];
    ring_enable_a = 0; /* no ring                     */
    line_current_a = 0; /* no line current            */
    break;

case 04:                    /* OFF HOOK                    */
    tx_ab[DEV_A] = 0x8f;    /* send loop open          */
    QCC.SIG[DEV_A] = tx_ab[DEV_A];
    ring_enable_a = 0; /* no ring                     */
    line_current_a = 1; /* line current               */
    break;

case 05:                    /* ON HOOK, NO RING           */
    tx_ab[DEV_A] = 0x87;    /* send loop open          */
    QCC.SIG[DEV_A] = tx_ab[DEV_A];
    ring_enable_a = 0; /* no ring                     */
    line_current_a = 0; /* no line current            */
    break;
```

```
case 06:                /* NO TIP GROUND, OFF HOOK */
    tx_ab[DEV_A] = 0x87;    /* send loop open      */
    QCC.SIG[DEV_A] = tx_ab[DEV_A];
    ring_enable_a = 0; /* no ring                  */
    line_current_a = 0; /* no line current         */
    break;

case 07:                /* NO TIP GROUND, ON HOOK */
    tx_ab[DEV_A] = 0x87;    /* send loop open      */
    QCC.SIG[DEV_A] = tx_ab[DEV_A];
    ring_enable_a = 0; /* no ring                  */
    line_current_a = 0; /* no line current         */
    break;

}
} void do_loop_signaling_b(void) using SIGNAL_RBANK {
    uchar temp;

was_leased[DEV_B] = 0;
    timer_sig_b = 0;
    flag_sig_b = 0; /* don't run timer here */
    temp = (valid_rab[DEV_B] << 1) | on_hook_b;
/* ACC = xxxx xB-A-HS                              */ switch(temp) {
    case 0:                 /* END OF RING         */
        tx_ab[DEV_B] = 0x8f;    /* send loop closure */
        QCC.SIG[DEV_B] = tx_ab[DEV_B];
/*      send_tone_1 = 0;        /*                  */
        ring_enable_b = 0; /* no ring              */
        line_current_b = 1; /* line current present */
        break;

case 01:                /* ON HOOK, RING       */
        tx_ab[DEV_B] = 0x87;    /* send loop open   */
        QCC.SIG[DEV_B] = tx_ab[DEV_B];
        ring_timer_b = 0;
        ring_on_flag_b = 0;
        ring_on_time_b = 0;
        ring_enable_b = 1; /* ring                 */
        line_current_b = 0; /* no line current     */
        break;

case 02:                /* NO TIP GROUND, OFF HOOK */
        tx_ab[DEV_B] = 0x83;    /* send ring ground */
        QCC.SIG[DEV_B] = tx_ab[DEV_B];
        ring_enable_b = 0; /* no ring              */
        line_current_b = 0; /* no line current     */
        break;
```

```
case 03:                      /* NO TIP GROUND, ON HOOK */
    tx_ab[DEV_B] = 0x87;      /* send loop open         */
    QCC.SIG[DEV_B] = tx_ab[DEV_B];
    ring_enable_b = 0; /* no ring                       */
    line_current_b = 0; /* no line current              */
    break;

case 04:                      /* OFF HOOK               */
    tx_ab[DEV_B] = 0x87;      /* send loop open         */
    QCC.SIG[DEV_B] = tx_ab[DEV_B];
    ring_enable_b = 0; /* no ring                       */
    line_current_b = 1; /* line current                 */
    break;

case 05:                      /* ON HOOK, NO RING       */
    tx_ab[DEV_B] = 0x87;      /* send loop open         */
    QCC.SIG[DEV_B] = tx_ab[DEV_B];
    ring_enable_b = 0; /* no ring                       */
    line_current_b = 0; /* no line current              */
    break;

case 06:                      /* NO TIP GROUND, OFF HOOK */
    tx_ab[DEV_B] = 0x87;      /* send loop open         */
    QCC.SIG[DEV_B] = tx_ab[DEV_B];
    ring_enable_b = 0; /* no ring                       */
    line_current_b = 0; /* no line current              */
    break;

case 07:                      /* NO TIP GROUND, ON HOOK */
    tx_ab[DEV_B] = 0x87;      /* send loop open         */
    QCC.SIG[DEV_B] = tx_ab[DEV_B];
    ring_enable_b = 0; /* no ring                       */
    line_current_b = 0; /* no line current              */
    break;
    }
}

/************************************************************/
/*      handle_dial_signaling()                             */
/*      This module checks to see if we need to check       */
/*      the signaling state machine.                        */
/*      return(1) if new state                              */
/************************************************************/
uchar handle_dial_signaling_a(void) using SIGNAL_RBANK { uchar temp;
    uchar check_hook_state_a(void);
```

```
/* temp = rx_ab[DEV_A];*/              /* ACC = MFxxx ABCD */
/* temp = temp >> 1;*/                 /* ACC = 0xxx xABC  */
/* CY = BSIG;*/
/* ASIG = CY;*/                        /* ACC = 0xxx xABA  */
/* temp = ACC & 03;*/
/* temp &= 0x03;*/                     /* ACC = 0000 00BA  */
/* B = temp;*/
temp = rx_ab[DEV_A] & 0x0c;            /* rx_ab = Fxxx ABCD */
temp = (((temp >> 2) | temp) >> 1) & 03; /* temp = 0000 00BA */
if (temp != current_rab_a) {
  current_rab_a = temp;
  rab_count_a = 1;
  if (check_hook_state_a()) return(1);
    return(0);
} else if (rab_count_a == 3) {
  if (check_hook_state_a()) return(1);
    return(0);
} else {
  ++rab_count_a;
  if (rab_count_a == 3) {
    valid_rab[DEV_A] = current_rab_a;  /* 0000 00BA         */
    return(1);
  } else {
    if (check_hook_state_a()) return(1);
      return(0);
  }
 }
} uchar handle_dial_signaling_b(void) using SIGNAL_RBANK { uchar temp;
  uchar check_hook_state_b(void);

/* temp = rx_ab[DEV_A];*/              /* ACC = MFxxx ABCD */
/* temp = temp >> 1;*/                 /* ACC = 0xxx xABC  */
/* CY = BSIG;*/
/* ASIG = CY;*/                        /* ACC = 0xxx xABA  */
/* temp = ACC & 03;*/
/* temp &= 0x03;*/                     /* ACC = 0000 00BA  */
/* B = temp;*/
temp = rx_ab[DEV_B] & 0x0c;            /* rx_ab = Fxxx ABCD */
temp = (((temp >> 2) | temp) >> 1) & 03; /* temp = 0000 00BA */
if (temp != current_rab_b) {
  current_rab_b = temp;
  rab_count_b = 1;
  if (check_hook_state_b()) return(1);
    return(0);
} else if (rab_count_b == 3) {
  if (check_hook_state_b()) return(1);
    return(0);
} else {
  ++rab_count_b;
  if (rab_count_b == 3) {
```

```
    valid_rab[DEV_B] = current_rab_b;    /* 0000 00BA    */
    return(1);
  } else {
    if (check_hook_state_b()) return(1);
      return(0);
    }
  }
} uchar check_hook_state_a(void) using SIGNAL_RBANK {
  if ((on_hook_a) ^ (prev_on_hook_a)) {
    prev_on_hook_a = on_hook_a;
    return(1);
  }
  else if (flag_sig_a)
    return(1);
  else
    return(0);
} uchar check_hook_state_b(void) using SIGNAL_RBANK {
  if ((on_hook_b) ^ (prev_on_hook_b)) {
    prev_on_hook_b = on_hook_b;
    return(1);
  }
  else if (flag_sig_b)
    return(1);
  else
    return(0);
}
```

```
/*&&&& srb
    Program modified 12/20/94 to fit DHM
*/ pragma SB OT(5) NOIV DB CD FL(60)

/*------------------- Includes -------------------*/ include <ctype.h>
include <MX51.h>
#include <absacc.h>
#include <intrins.h>
include <dmdp.h> include "LVWDEF.H"

/*------------------- Constant Definitions -------------------*/
/* &&&& took out ring stuff */ define   FALSE           0
define   TRUE            !FALSE

/*------------------- External Routines -------------------*/
extern void background_task(void);
define background_ID    7 extern UChar data rx_ab[2],tx_ab[2];     /* note move to signal.c     */
                /* start srb 1/13/94 */ extern SNMPLong uptime;

extern xuchar    event_byte[2][2];

/* alarm bit definitions */
extern xuchar no_dt_alarm[2],ring_no_ans_alarm[2],dtr_drop_alarm[2],power_up_alarm;
extern xuchar no_dt_alarmed[2],ring_na_alarmed[2];
extern xuchar no_dt_alm_clr[2],ring_na_alm_clr[2],dtr_drop_alm_clr[2];
extern xuchar incoming_call[2],off_hook_now[2],call_connected[2];
extern xuchar dial_attempt[2],ans_attempt[2];
extern xuchar load_alarm,load_alm_clr,load_alarmed;
extern xuchar old_dtr[2][2];
        /* end srb 1/13/94 */ extern bit switch_2_boot;  /* 12/19                    */
/*&&&& 12/20/94 srb */
/*extern xdata device_regs IO[4];*/
/*&&&&*/
extern bit request_flash_session,prepare_softload,ready_2_write_a_page;
extern bit ready_for_soft_page,flash_done_and_OK,flash_done_and_BAD;
extern xdata UChar rx_buffer[256], COMM_LOCK;
char data *portal_ID_byte;      /* pointer to pass infomation to other prom */
```

D1

UD094058
Data Interrupt
Modules

Programmer: Tim Pearson

Data routing routines

```
extern xdata UChar ID_byte;

extern bit MUX_LOOP; /* MUX_LOOP controlled by MFG_TEST */
extern unsigned char DEVICE_AB_CTRL_COPY; /* IMAGE of HARDWARE port */
extern xdata Modem Devices[]; /* array of structures of devices of type modem */
extern code unsigned char uLAW_2_Alaw [];
extern code unsigned char ALAW_2_ulaw [];
extern code unsigned char table_dmw [];
EXUChar rx_comm_buff[];
extern void status_check(UChar dev_num, UChar *dest_pointer);
EXUChar dev_selected;
/*&&&&*/
/*EUChar data ring_enable[2];*/
/*&&&&*/

/* ---------------------------------------------------
   --------------- Global Variable Definitions ---------
   --------------------------------------------------- */
static uchar data dmw_a,dmw_b;
/* xdata struct timer ring_toggle_A;    */
/* xdata struct timer ring_toggle_B;    */ extern bit DEVA_AB_BUS, DEVA_uA_PCM, DEVA_LAL; /* A bus = 0, uLaw = 0, LAL = 1 */
extern bit DEVB_AB_BUS, DEVB_uA_PCM, DEVB_LAL; /* A bus = 0, uLaw = 0, LAL = 1 */
extern bit DEVA_OH,DEVB_OH,DEVA_DMW,DEVB_DMW;

extern bit super_frame;
/*--------------- Internal Function Declarations ---------------*/ void EX0_ISR(void);
void EX1_ISR(void);

/*--------------- Data Storage ---------------*/ data unsigned int Timer;                    /* general purpose 1 mSec timer */
/* xuchar dev_loaded = 1;/* number of channels active     */
unsigned char data temp;
extern data UInt page_count;    /* defined in lv_parse           */
UInt modem_checksum;
UChar byte_count;
bit modem0_powerup_bad,modem1_powerup_bad;
bit skip_BBBC;
/*--------------- Interrupts ---------------*/

/*******************************************
*
* Name: FUNCtion EX0_ISR() - B-BUS
*
* Purpose:   interrupt service function for 8052 external int 1
*
* Input: none
*
* Function:
*
```

```
* Output: none
*
* Scope:   none
*
* History:
*/
/* BUS - B interrupt                                                    */
void EX0_ISR() interrupt 0 using 1
{
unsigned char data temp1,temp2;

if(DEVB_AB_BUS)                 /* modem B, is on bus B jig*/
        {
        rx_ab[DEV_B] = QCC.SIG[DEV_B];   /* get received signaling bits   */
        QCC.SIG[DEV_B] = tx_ab[DEV_B];   /* put tx signaling bits    */
            temp1 = QCC.DATA[DEV_B];
/*&&&& srb 12/20/94 */
        temp2 = DEVICE_B_INTRP;
/*&&&&*/ if(DEVB_LAL && !MUX_LOOP)        /* MUX_LOOP controlled by MFG_TEST */
/*&&&& srb 12/20/94 */
        DEVICE_B_INTRP = temp2;          /* perform modem loop */
/*&&&&*/
        else
        {
        if (DEVB_DMW)
           {
           temp2 = table_dmw[(dmw_b++)%8];
           }
            if(DEVB_uA_PCM)              /* check for A Law encoding */
            {
            temp1 ^= 0x55;               /* xor even bits to determine table index */
            temp1 = ALAW_2_ulaw[temp1];  /* convert to u Law value*/
            temp2 = uLAW_2_Alaw[temp2];  /* convert to A Law table value */
            temp2 ^= 0x55;               /* xor even bits to get A Law data */
            }

QCC.DATA[DEV_B] = temp2;
/*&&&& srb 12/20/94 */
        DEVICE_B_INTRP = temp1;          /* QCC.RX -> CH-A CODEC    */
/*&&&&*/
        }
        } if(DEVA_AB_BUS)                  /* modem A, is on bus B jig*/
        {
        rx_ab[DEV_A] = QCC.SIG[DEV_A];   /* get received signaling bits   */
        QCC.SIG[DEV_A] = tx_ab[DEV_A];   /* put tx signaling bits    */
            temp1 = QCC.DATA[DEV_A];
/*&&&& srb 12/20/94 */
        temp2 = DEVICE_A_INTRP;
/*&&&&*/
```

```
        if(DEVA_LAL && !MUX_LOOP)      /* MUX_LOOP controlled by MPG_TEST */
/*&&&& srb 12/20/94 */
        DEVICE_A_INTRP = temp2;        /* perform modem loop */
/*&&&&*/
        else
        {
        if (DEVA_DMW)
            {
            temp2 = table_dmw[(dmw_a++)%8];
            }
            if(DEVA_uA_PCM)             /* check for A Law encoding */
            {
                temp1 ^= 0x55;          /* xor even bits to determine table index */
                temp1 = ALAW_2_ulaw[temp1];    /* convert to u Law value */
                temp2 = uLAW_2_Alaw[temp2];    /* convert to A Law table value */
                temp2 ^= 0x55;          /* xor even bits to get A Law data */
            }

QCC.DATA[DEV_A] = temp2;
/*&&&& srb 12/20/94 */
        DEVICE_A_INTRP = temp1;        /* QCC.RX -> CH-A CODEC    */
/*&&&&*/
        }
    }

}   /* end External_Int0 */

/*************************************
*
* Name: FUNCtion EX1_ISR() - A - BUS
*
* Purpose:   interrupt service function for 8052 external int 1
*
* Input: none
*
* Function:
*
* Output: none
*
* Scope:     none
*
* History:
*/
/* BUS - A interrupt                                            */
void EX1_ISR() interrupt 2 using 3
{
unsigned char data temp1,temp2;

if(!DEVA_AB_BUS)               /* modem A, is on bus A jjg*/
        {
            if (QCC.SIG[DEV_A] & 0x80){
```

```
        rx_ab[DEV_A] = QCC.SIG[DEV_A];      /* get received signaling bits   */
        super_frame = 1;
      }
        QCC.SIG[DEV_A] = tx_ab[DEV_A];      /* put tx signaling bits   */
        temp1 = QCC.DATA[DEV_A];
/*&&&& srb 12/20/94 */
        temp2 = DEVICE_A_INTRP;
/*&&&&*/ if(DEVA_LAL && !MUX_LOOP)           /* MUX_LOOP controlled by MFG_TEST */
/*&&&& srb 12/20/94 */
          DEVICE_A_INTRP = temp2;           /* perform modem loop */
/*&&&&*/
          else
          {
        if (DEVA_DMW)
          {
          temp2 = table_dmw[(dmw_a++)%8];
          }
          if(DEVA_uA_PCM)                   /* check for A Law encoding */
          {
            temp1 ^= 0x55;                  /* xor even bits to determine table index */
            temp1 = ALAW_2_ulaw[temp1];     /* convert to u Law value*/
            temp2 = uLAW_2_Alaw[temp2];     /* convert to A Law table value */
          temp2 ^= 0x55;                    /* xor even bits to get A Law data */
          }

QCC.DATA[DEV_A] = temp2;
/*&&&& srb 12/20/94 */
        DEVICE_A_INTRP = temp1;             /* QCC.RX -> CH-A CODEC   */
/*&&&&*/
          }
        } if(!DEVB_AB_BUS)                    /* modem B, is on bus A jig*/
          {
        rx_ab[DEV_B] = QCC.SIG[DEV_B];      /* get received signaling bits   */
        QCC.SIG[DEV_B] = tx_ab[DEV_B];      /* put tx signaling bits   */
        temp1 = QCC.DATA[DEV_B];
/*&&&& srb 12/20/94 */
        temp2 = DEVICE_B_INTRP;
/*&&&&*/ if(DEVB_LAL && !MUX_LOOP)           /* MUX_LOOP controlled by MFG_TEST */
/*&&&& srb 12/20/94 */
          DEVICE_B_INTRP = temp2;           /* perform modem loop */
/*&&&&*/
          else
          {
        if (DEVB_DMW)
          {
          temp2 = table_dmw[(dmw_b++)%8];
          }
          if(DEVB_uA_PCM)                   /* check for A Law encoding */
```

```
        {
            temp1 ^= 0x55;              /* xor even bits to determine table index */
            temp1 = ALAW_2_uLaw[temp1]; /* convert to u Law value */
            temp2 = uLAW_2_Alaw[temp2]; /* convert to A Law table value */
            temp2 ^= 0x55;              /* xor even bits to get A Law data */
        }

QCC.DATA[DEV_B] = temp2;
/*&&&& arb 12/20/94 */
        DEVICE_B_INTRP = temp1;         /* QCC.RX -> CH-A CODEC      */
/*&&&&*/
        }
    }

}   /* end External_Int1 */

/*---------------- Main Module ----------------*/
/*********************************************************/
/*  main_task() -                                       */
/*********************************************************/
void main_task()
{
char data *dp;
void wait_for_reset(void);
bit read_modem_checksum(UChar device);
void prepare_modem_4_softload(void);
void write_a_page(void);
void write_a_byte(unsigned char dev,unsigned char x);
UChar read_a_byte(unsigned char dev);
extern bit blink_flag;
extern xuchar ID_byte;
void warm_start(void);
/*&&&&*/
extern data UChar rx_sb[],valid_rnb[],was_leased[];
/*&&&&*/

/*      TMOD = (TMOD & 0x0F) | 0x20;        /* jtp      */
        TMOD = (TMOD & 0x0F) | 0x10;        /* jtp      */
        TH1 = 0xF6;                         /* jtp      */
        TL1 = 0x6E;                         /* jtp      */
        TR1 = 1;                            /* jtp      */
        ET1 = 1;                            /* jtp      */

PCON = PCON | 0x80;     /* SMOD = 1     */

RCAP2H = 0xFF;
        RCAP2L = 0xE0;
        T2CON = 0x34;
        SCON = 0x50;
```

```
        REN = 1;
        PCON = 0x00;

IT1 = 1;        /*      MUX_INTA = EDGE TRIGGERED       */
        IT0 = 1;        /*      MUX_INTB = EDGE TRIGGERED       */

/*      QCC_925 chip initialization                             */
        ROM = 0;
        SYSTEM_RESET = 1;
        /*BANK_SW_ENABLE = 0;                   COMMENTED 1/30/95 JNM */
        BANK_0 = 0;
        BANK_1 = 0;

QCC.SETUP = 0x00;
        QCC.CONFIG[0] = 0x40;
        QCC.CONFIG[1] = 0x40;   /* now both on bus A */

/* &&&& begin */
        tx_ab[DEV_A] = 0x8f;    /* jtp initial state for tx AB bits     */
        tx_ab[DEV_B] = 0x8f;    /* jtp initial state for tx AB bits     */
        QCC.SIG[DEV_A] = tx_ab[DEV_A];  /* jtp changed to 0x80 was 0x8f */
        QCC.SIG[DEV_B] = tx_ab[DEV_B];  /* jtp changed to 0x80 was 0x8f */
        rx_ab[DEV_A] = 0x8f;
        rx_ab[DEV_B] = 0x8f;
        valid_rab[DEV_A] = 0x03;
        valid_rab[DEV_B] = 0x03;
        was_leased[DEV_A] = 1;
        was_leased[DEV_B] = 1;
/* &&&& end */

DEVICE_AB_CTRL_COPY = RING_B | SEL_A | RING_A;          /* note RING_A active
low     */
/*&&&&*/
        DEVICE_AB_CTRL_COPY |= DIGITAL_A;       /* default A to MDP mode */
        DEVICE_AB_CTRL_COPY |= DIGITAL_B;       /* default B to MDP mode */
/*&&&&*/
        DEVICE_AB_CTRL = DEVICE_AB_CTRL_COPY;   /* IMAGE TO HARDWARE */

/*&&&& srb 12/20/94 */
        temp = DEVICE_A_COMM;   /* dummy read to clear MSG_AVAIL        */
        temp = DEVICE_B_COMM;   /* dummy read to clear MSG_AVAIL        */
/*&&&&*/

/*      if (CH_SEL_B == 0 && CH_SEL_A == 0)             /* 1 channel loaded     */
/*         dev_loaded = 0;      */
/*      else if (CH_SEL_B == 0 && CH_SEL_A == 1)        /* 2 channels loaded    */
/*         dev_loaded = 1;      */
/*      else if (CH_SEL_B == 1 && CH_SEL_A == 0)        /* 3 channels loaded    */
/*         dev_loaded = 2;      */
/*      else if (CH_SEL_B == 1 && CH_SEL_A == 1)        /* 4 channels loaded    */
/*         dev_loaded = 3;      */
```

```
        IP = 0x05;   /* make INTRP interrupts high priority so data doesn't skip 10/27/94 9:59 PM jjg
*/

EX1 = 1;      /*      ENABLE EXTERNAL INTERRUPT 1       */
            EX0 = 1;      /*      ENABLE EXTERNAL INTERRUPT 0       */

/* This code was added to insure a graceful transition after softload        */
/* If the serial port interrupt enable is already enabled then we were       */
/* in the boot code doing a softload. We need to insure that the             */
/* CISS ID byte (portal_ID byte is NOT '0' which means that there is         */
/* is modem soft pages to follow.                                            */
            if (ES == 1) {
                EX0 = 0;             /* QCC interrupts     */
                EX1 = 0;
                ET1 = 0;                      /* jrp       */
                portal_ID_byte = 0xFF; /* if ID_byte != 'ALL' is then reset */
                ID_byte = *portal_ID_byte;
                if (*portal_ID_byte != '0') {
              wait_for_reset();
            } else {              /* ID_byte == 'ALL'       */
/*                                    /* was flash bad at powerup??        */   */
/*           skip_BBBC = 1;            /* don't ask modem for checksum      */   */
             pause(0,2000);             /* give time for PTD/ACK/EOT        */   */
             prepare_softload = 1;   /* go erase modems                     */
            }
            }

/*          ES = 1 ;      /*    moved to nonvol              */
            EA = 1 ;

/* start 1/13/95 srb - initialize alarm stuff here*/
            uptime.lword = 0;
            no_dt_alarm[0] = 0; no_dt_alarm[1] = 0;
            ring_no_ans_alarm[0] = 0; ring_no_ans_alarm[1] = 0;
            dtr_drop_alarm[0] = 0; dtr_drop_alarm[1] = 0;
/*          power_up_alarm = 1;      /*     moved to nonvol           */
            incoming_call[0] = 0; incoming_call[1] = 0;
            off_hook_now[0] = 0; off_hook_now[1] = 0;
            no_dt_alarmed[0] = 0; no_dt_alarmed[1] = 0;
            ring_na_alarmed[0] = 0; ring_na_alarmed[1] = 0;
            no_dt_alm_clr[0] = 0; no_dt_alm_clr[1] = 0;
            ring_na_alm_clr[0] = 0; ring_na_alm_clr[1] = 0;
            dtr_drop_alm_clr[0] = 0; dtr_drop_alm_clr[1] = 0;
            call_connected[0] = 0; call_connected[1] = 0;
            dial_attempt[0] = 0; dial_attempt[1] = 0;
            ans_attempt[0] = 0; ans_attempt[1] = 0;
            load_alarm = 0; load_alm_clr = 0; load_alarmed = 0;
            old_dtr[0][0] = 1; old_dtr[0][1] = 1;
            old_dtr[1][0] = 1; old_dtr[1][1] = 1;
/* end 1/13/95 srb */
```

```
            blink_flag = 1;
            pause(0,1000);
            blink_flag = 0;
         POWER_LED = LED_ON;
            dp = 0xFE;                    /* this is initialized in boot to 55 */ if (*dp == 0x55) {               /* if idata (FE) == 55 we've never */
            *dp = 00;                     /* asked the modems for a checksum */

/*    if (!_testbit_(skip_BBBC)) {    /* don't ask modem for checksum       */ if (read_modem_checksum(0)) {
               modem0_powerup_bad = 1;
            }
            if (read_modem_checksum(1)) {   /*                              */
               modem1_powerup_bad = 1;      /*                              */
            }                               /*                              */ if (modem0_powerup_bad || modem1_powerup_bad) { /* one is bad     */
            ES = 1;
   /*       QCC.LOCALVIEW = ATTENTION_REQUEST; 1/13/95 arb */
            request_flash_session = 1;      /* if checksum fails don't */
            lock(&COMM_LOCK);               /* run anything else       */
         } else {                           /* both OK, start nonvol task */
            reset_task(&background_task.background_ID);
         }
      } pause(0,2000);

while (1) {

/* added 12/19              */
               if (_testbit_(switch_2_boot)) {
                  portal_ID_byte = 0xFF;  /* pass ID_byte through portal */
                  *portal_ID_byte = ID_byte;
                  pause(0,500);           /* give time for PTD/ACK/EOT */
                  EA = 0;
         BANK_SW_ENABLE = 0;              /* Force to zero so that boot */
                                          /* code will have access to flash*/
                                          /* BANK_SW_ENABLE = 0 (flash) */
                                          /* BANK_SW_ENABLE = 1 (IO)    */
                  CY = 1;                 /* Jump to BOOT code          */
                  warm_start();           /* warm_start(CY = 0) ..FLASH */
               }
   /* end of added 12/19       */
               if (_testbit_(prepare_softload)) {
                  prepare_modem_4_softload();
               } if (_testbit_(ready_2_write_a_page)) {
                  write_a_page();
               }
```

```
                blink_flag ^= blink_flag;
                scan_next();
        }
    } void write_a_byte(unsigned char dev, unsigned char x) {
    /*&&&& srb 12/20/94 */
      if (dev == 0)
      {
            DEVICE_A_COMM = x;
            while ((DEVICE_A_STATUS & MSG_RX_A) != 0);      /*                    */
      }
      else
      {
            DEVICE_B_COMM = x;
            while ((DEVICE_B_STATUS & MSG_RX_B) != 0);      /*                    */
      }
    /*&&&&*/
    }

UChar read_a_byte(unsigned char dev) {
    /*&&&& srb 12/20/94 */
      if (dev == 0)
      {
            while((DEVICE_A_STATUS & MSG_AVAIL_A) == 0);
            return (DEVICE_A_COMM);
      }
      else
      {
            while((DEVICE_B_STATUS & MSG_AVAIL_B) == 0);
            return (DEVICE_B_COMM);
      }
    /*&&&&*/
    }

/******************************************************************/
    /*   read_modem_checksum()                                        */
    /* This module is only called on power up after we have switched to the*/
    /* flash eprom(8032). The modem will not run until the controller  */
    /* asks for its checksum. The sequence to read the checksum is as  */
    /* follows:                                                        */
    /*                                                                 */
    /*   write (0xBB) to modem                                         */
    /*   write (0xBC) to modem                                         */
    /*   wait for echo of 0xBB                                         */
    /*   wait for echo of 0xBC                                         */
    /*   wait for checksum byte  (55 = good, 0xAA = BAD                */
    /*   If the checksum is good the modem will power up and operate. if */
    /*   its bad it will stay in the boot code until we start the softload */
```

```c
/* command.                                              */
/* return(1) fail                                        */
/* return(0) pass                                        */
/******************************************************/
bit read_modem_checksum(UChar device) {
  UChar temp;

/*&&&& srb 12/20/94 */
  if (device == 0)
  {
    temp = DEVICE_A_COMM;     /* DUMMY READ */

DEVICE_A_COMM = 0xBB;     /* request checksum from modem   */
    while ((DEVICE_A_STATUS & MSG_RX_A) != 0);      /*        */
    DEVICE_A_COMM = 0xBC;     /* request checksum from modem   */ while (1) {
      while((DEVICE_A_STATUS & MSG_AVAIL_A) == 0);
      if (DEVICE_A_COMM == 0xBB) {
          while((DEVICE_A_STATUS & MSG_AVAIL_A) == 0);
          if (DEVICE_A_COMM == 0xBC) {
            while((DEVICE_A_STATUS & MSG_AVAIL_A) == 0);
              temp = DEVICE_A_COMM;       /* this is checksum   */
              break;
          }
      }
    }
  }
  else
  {
    temp = DEVICE_B_COMM;     /* DUMMY READ */

DEVICE_B_COMM = 0xBB;     /* request checksum from modem   */
    while ((DEVICE_B_STATUS & MSG_RX_B) != 0);      /*        */
    DEVICE_B_COMM = 0xBC;     /* request checksum from modem   */ while (1) {
      while((DEVICE_B_STATUS & MSG_AVAIL_B) == 0);
      if (DEVICE_B_COMM == 0xBB) {
          while((DEVICE_B_STATUS & MSG_AVAIL_B) == 0);
          if (DEVICE_B_COMM == 0xBC) {
            while((DEVICE_B_STATUS & MSG_AVAIL_B) == 0);
              temp = DEVICE_B_COMM;       /* this is checksum   */
              break;
          }
      }
    }
  }
/*&&&&*/ if (temp == 0x55) {         /* GOOD CHECKSUM                 */
    return(0);
  } else {
    return(1);
```

```c
   }
 } void prepare_modem_4_softload(void) {
  void write_a_byte(unsigned char dev, unsigned char x);
  unsigned char read_a_byte(unsigned char dev);
  extern xuchar ID_byte;
  if (!modem0_powerup_bad && !modem1_powerup_bad) {
    wait(&COMM_LOCK);    /* wait for access to comm_task */
    lock(&COMM_LOCK);    /* set semaphore to zero so no one else can access */
  }
  if (ID_byte == '0' || ID_byte == '2' || ID_byte == '3') {
    if (modem0_powerup_bad) {
      write_a_byte(0,0x55);    /* device 0     length       */
      write_a_byte(0,0x55);    /*              generic      */
    } else {
      write_a_byte(0,0x02);    /* device 0     length       */
      write_a_byte(0,0x30);    /*              generic      */
      write_a_byte(0,0xFF);    /*              softload */
      read_a_byte(0);          /* read response       */
      read_a_byte(0);          /* read response       */
    }
    pause(0,1000);
    write_a_byte(0,0x10);      /* length    MSB */
    write_a_byte(0,0x00);      /* length    CSB */
    write_a_byte(0,0x00);      /* length    LSB */
  }
  if (ID_byte == '0' || ID_byte == '2' || ID_byte == '4') {
    if (modem1_powerup_bad) {
      write_a_byte(1,0x55);    /* device 1     length       */
      write_a_byte(1,0x55);    /*              generic      */
    } else {
      write_a_byte(1,0x02);    /* device 1     length       */
      write_a_byte(1,0x30);    /*              generic      */
      write_a_byte(1,0xFF);    /*              softload */
      read_a_byte(1);          /* read response       */
      read_a_byte(1);          /* read response       */
    }
    pause(0,1000);
    write_a_byte(1,0x10);      /* length    MSB */
    write_a_byte(1,0x00);      /* length    CSB */
    write_a_byte(1,0x00);      /* length    LSB */
  }
  modem_checksum = 0x0000;
  pause(0,8000);
  byte_count = 0;
  page_count = 0;
  ready_for_soft_page = 1;
  /* QCC.LOCALVIEW = ATTENTION_REQUEST; 1/13/95 srb */  /* move to NONVOL.C module */

}
```

```c
void write_a_page(void)
{
void wait_for_reset(void);
extern xuchar ID_byte;
bit do_modem_1,do_modem_2;
UChar i,temp,byte;

temp = rx_buffer[RX_LEN]-3;
    if (ID_byte == '0' || ID_byte == '2' || ID_byte == '3')
      do_modem_1 = 1;
    else
      do_modem_1 = 0;

if (ID_byte == '0' || ID_byte == '2' || ID_byte == '4')
      do_modem_2 = 1;
    else
      do_modem_2 = 0;

for (i = 0; i < temp; ++i) {
      byte = rx_buffer[RX_XCD + i + 2];
            if (do_modem_1)              /* both modems or 1    */
              write_a_byte(0,byte);
            if (do_modem_2)              /* both modems or 2    */
              write_a_byte(1,byte);

++byte_count;
    if (byte_count == 0)
        ++page_count;
        if (page_count >= 0x200) {
           modem_checksum += ~(rx_buffer[RX_XCD+i+2]);
    }
      } if (rx_buffer[RX_XCD+1] == 0) {
        modem_checksum -= 1;
        if (ID_byte == '0' || ID_byte == '2' || ID_byte == '3') { /* both modems or 1  */
          write_a_byte(0,(modem_checksum >> 8));
          write_a_byte(0,(modem_checksum & 0x00FF));
      if (read_a_byte(0) == 0x55)
          modem0_powerup_bad = 0;
      else
          modem0_powerup_bad = 1;
    }
        if (ID_byte == '0' || ID_byte == '2' || ID_byte == '4') { /* both modems or 2  */
          write_a_byte(1,(modem_checksum >> 8));
          write_a_byte(1,(modem_checksum & 0x00FF));
      if (read_a_byte(1) == 0x55)
          modem1_powerup_bad = 0;
        else
          modem1_powerup_bad = 1;
    }
    if (!modem0_powerup_bad && !modem1_powerup_bad) { /* if BOTH pass */
        ready_for_soft_page = 0;
        flash_done_and_OK = 1;    /* forces DASS - 1       */
```

```
/*      QCC.LOCALVIEW = ATTENTION_REQUEST; 1/13/95 srb */   /* move to NONVOL.C
module */
        pause(0,500);         /* give time for DASS/ACK/EOT */
        wait_for_reset();
    } else {                  /* if EITHER fails            */
    ready_for_soft_page = 0;
    flash_done_and_BAD = 1;   /* forces DASS - 0            */
/*      QCC.LOCALVIEW = ATTENTION_REQUEST; 1/13/95 srb */   /* move to NONVOL.C
module */
        pause(0,500);         /* give time for DASS/ACK/EOT */
        wait_for_reset();
    }
   } else {
    _nop_();
/*  ready_for_soft_page = 1;        */
   }

/*      QCC.LOCALVIEW = ATTENTION_REQUEST;   /* move to NONVOL.C module */
}

/* This module disables interrupts and waits in a tight loop for the    */
/* watch dog to reset the board.                                        */
void wait_for_reset(void) {
 EA = 0;
 while (1);

} code UChar table_dmw [] = {
0x1E,0x0B,0x0B,0x1E,0x9E,0x8B,0x8B,0x9E
};
```

We claim:

1. A data communications device selectively operable in at least one of a plurality of operating modes, including a first operating mode and a second operating mode, the data communications device coupleable to a terminal and to at least two of a plurality of communications networks for transferring data between the terminal and one of the plurality of communications networks, including a first communications network and a second communications network, the data communications device comprising:

a controller;

a data pump coupled to the controller;

a first codec coupled to the data pump;

a second codec;

a first interface circuit coupleable to the first communications network;

a second interface circuit coupleable to the second communications network;

a first switch coupled to the first codec, to the second codec and to the first interface circuit; and a processor coupled to the controller, to the second codec, to the first interface circuit, to the second interface circuit, and to the first switch, the processor responsive to a status signal to selectively configure the data communications device for operation in the first operating mode for communications through the first communications network and for operation in the second operating mode for communications through the second communications network.

2. The data communications device of claim 1 wherein the status signal is provided by the second interface circuit.

3. The data communications device of claim 1 wherein the status signal is a carrier alarm generated by the second interface circuit.

4. The data communications device of claim 1 wherein the processor is further responsive to the duration of the status signal.

5. The data communications device of claim 1 wherein the status signal changes state in response to the operating state of the second communications network.

6. The data communications device of claim 5 wherein the processor is further responsive to the duration of the change of state of the status signal.

7. The data communications device of claim 1 wherein the status signal has two values.

8. The data communications device of claim 1 wherein the status signal further comprises first and second identifiable signals.

9. The data communications device of claim 1 wherein the processor is further responsive to a duration of a change of state of the status signal from a first value to a second value, to selectively configure the data communications device for operation in the first operating mode for communications through the first communications network when the status signal has changed state from a first value to a second value, the second value maintained for a first period of time, and for operation in the second operating mode for communications through the second communications network when the second value of the status signal has not been maintained for the first period of time.

10. The data communications device of claim 1 wherein the processor is further responsive to a duration of a change of state of the status signal from a second value to a first value, to selectively configure the data communications device for operation in the second operating mode for communications through the second communications network when the status signal has changed state from a second value to a first value, the first value maintained for a second period of time, and for operation in the first operating mode for communications through the first communications network when the first value of the status signal has not been maintained for the second period of time.

11. The data communications device of claim 1 wherein the processor is further responsive to a duration of a value of the status signal to selectively configure the data communications device for operation in the first operating mode for communications through the first communications network when the status signal has a first value maintained for a first duration, and for operation in the second operating mode for communications through the second communications network when the status signal has a second value maintained for a second duration.

12. The data communications device of claim 1 wherein the second interface circuit is responsive to a disruption of a carrier signal of the second communications network to produce a change of state of the status signal.

13. The data communications device of claim 1 wherein the first codec is a linear codec and wherein the second codec is a non-linear codec.

14. The data communications device of claim 13 wherein the non-linear codec is a mu-law PCM codec.

15. The data communications device of claim 13 wherein the non-linear codec is an A-law PCM codec.

16. The data communications device of claim 13 wherein the first communications network is a public switched telephone network.

17. The data communications device of claim 16 wherein the second communications network is a digital communications network.

18. The data communications device of claim 17 wherein the digital communications network has a T1 interface.

19. The data communications device of claim 17 wherein the digital communications network has an E1 interface.

20. The data communications device of claim 17 wherein the digital communications network is an Integrated Services Digital Network (ISDN).

21. The data communications device of claim 1, wherein:

the first communications network is a public switched telephone network, the second communications network is a digital communications network, the first interface circuit is an analog interface circuit, the second interface circuit is a digital interface circuit; and wherein the processor is responsive to a first value of the status signal to produce a first control signal to the first switch to selectively couple the first codec to the analog interface circuit and further responsive to a second value of the status signal to produce a second control signal to the first switch to selectively to couple the first codec to the second codec, whereby the data communications device is configured in an analog modem operating mode when the first codec is coupled to the analog interface circuit, and whereby the data communications device is configured in a digital modem operating mode when the first codec is coupled to the second codec.

22. The data communications device of claim 21 wherein the processor further comprises a microprocessor and a digital multiplexer and wherein the data pump further comprises a programmable digital signal processor.

23. The data communications device of claim 21 wherein the processor is further responsive to predetermined analog and digital signalling information.

24. The data communications device of claim 23 wherein the processor, in response to predetermined digital signalling information from a digital network, provides corresponding simulated analog signalling information to the controller.

25. The data communications device of claim 23 wherein the processor, in response to predetermined analog signalling information from the controller, provides corresponding simulated digital signalling information to a digital network.

26. The data communications device of claim 23 wherein the analog signalling information comprises a ring signal, line current, off hook, and loop bits, and wherein the digital signalling information comprises A and B bits.

27. The data communications device of claim 1, wherein:

the first communications network is a public switched telephone network, the second communications network is a digital communications network, the first interface circuit is an analog interface circuit, the second interface circuit is a digital interface circuit; and wherein the processor is responsive to a first value of the status signal to produce a first control signal to the first switch to selectively couple the first codec to the analog interface circuit and further responsive to a second value of the status signal to produce a processor command signal to the controller to selectively to couple the controller to the processor for direct data transmission between the controller and the processor, whereby the data communications device is configured in an analog modem operating mode when the first codec is coupled to the analog interface circuit, and whereby the data communications device is configured in a terminal adapter operating mode when the controller is coupled to the processor for direct data transmission between the controller and the processor.

28. A data communications device selectively configurable as an analog modem, as a digital modem, or as a terminal adapter, the selective configuration in response to at least one of a plurality of user command signals for configuration in a primary digital operating mode and an auxiliary analog operating mode, the data communications device coupleable to a terminal, to a public switched telephone network and to a digital communications network for transferring data between the terminal and one of the communications networks, the digital communications network having a digital carrier signal, the data communications device comprising:

a controller;

a data pump coupled to the controller;

a first codec coupled to the data pump;

a second codec;

an analog interface circuit coupleable to the public switched telephone network;

a digital interface circuit coupleable to the digital communications network, the digital interface circuit providing a status signal when coupled to the digital communications network, the status signal having a plurality of states including a first state and a second state, the digital interface circuit responsive to a disruption of the digital carrier signal to change a state of the status signal from the first state to the second state;

a first switch coupled to the first codec, to the second codec and to the analog interface circuit, the first switch responsive to a control signal; and a processor coupled to the controller, to the second codec, to the analog interface circuit, to the digital interface circuit, and to the first switch, the processor responsive to a first user command signal from the plurality of user command signals to configure the data communication device in the primary digital operating mode as a terminal adapter and thereby transfer data from the controller through the digital interface circuit, the processor further responsive to a second user command signal to produce the control signal to the first switch to selectively couple the first codec to the analog interface circuit and to couple the first codec to the second codec, whereby the data communication device is configured in the auxiliary analog operating mode as an analog modem when the first codec is coupled to the analog interface circuit, and whereby the data communication device is also configured in the primary digital operating mode as a digital modem when the first codec is coupled to the second codec; the processor further responsive to the change of state of the status signal to selectively reconfigure the data communication device from the primary digital operating mode to the auxiliary analog operating mode.

29. The data communications device of claim 28 wherein the processor is further responsive to the change of state of the status signal to selectively reconfigure the data communication device from the auxiliary analog operating mode to the primary digital operating mode.

30. The data communication device of claim 28 wherein the processor further comprises:

a distributed switch coupled to the first switch, the distributed switch providing a control signal to the first switch to selectively engage the analog interface circuit or the second codec; and a digital multiplexer coupled to the analog interface circuit and to the digital interface circuit to receive at least one of a plurality of information signals from the analog interface circuit or the digital interface circuit, and to transmit at least one of the plurality of information signals to the analog interface circuit or to the digital interface circuit.

31. The data communications device of claim 30 wherein the processor, in response to digital signalling information from a digital network, provides corresponding simulated analog signalling information to the controller.

32. The data communications device of claim 30 wherein the processor, in response to analog signalling information from the controller, provides corresponding simulated digital signalling information to a digital network.

33. A method of selectively operating a data communications device in at least one of a plurality of operating modes, including a primary digital operating mode and an auxiliary analog operating mode, the data communications device coupleable to a terminal and to at least one of a plurality of communications networks for transferring data between the terminal and one of the plurality of communications networks, including a digital communications network and an analog communications network, the method comprising:

(a) operating the data communications device in the primary digital operating mode;

(b) monitoring the state of the digital communications network;

(c) generating a status signal responsive to the monitored state of the digital communications network;

(d) reconfiguring the data communications device for operation in the auxiliary analog operating mode in response to a status signal indicating an impairment of the digital communications network;

(e) operating the data communications device in the auxiliary analog operating mode provided that the status signal indicates an impairment of the digital communications network; and (f) reconfiguring the data communications device for operation in the primary digital operating mode and proceeding to step (a), provided that the status signal ceases to indicate an impairment of the digital communications network.

34. The method of operating a data communications device of claim 33 wherein step (b) further comprises monitoring the digital carrier signal of the digital communications network.

35. The method of operating a data communications device of claim 33 wherein the digital communications network is a T1 network and the monitoring step (b) further comprises monitoring frame sync bits.

36. The method of operating a data communications device of claim 33 wherein step (c) further comprises:

(c1) generating a status signal having a logic low value in response to an impairment of the digital communications network;

(c2) maintaining the status signal at the logic low value for the duration of the impairment; and (c3) generating a status signal having a logic high value when the monitored state of the digital communications network indicates no impairment of the digital communications network.

37. The method of operating a data communications device of claim 33 wherein step (d) further comprises:

(d1) changing the state of the status signal in response to an impairment of the digital communications network;

(d2) reconfiguring the data communications device for operation in the auxiliary analog operating mode in response to the changed state of the status signal continuing for a first period of time.

38. The method of operating a data communications device of claim 33 wherein step (f) further comprises:

(f1) changing the state of the status signal in response to a cessation of an impairment of the digital communications network; and (f2) reconfiguring the data communications device for operation in the primary digital operating mode in response to the changed state of the status signal continuing for a second period of time.

39. The method of operating a data communications device of claim 33 wherein steps (d) and (f) further comprise:

providing a control signal to selectively engage the analog communication network or the digital communication network.

40. The method of operating a data communications device of claim 33 wherein step (a) further comprises:

(a1) simulating analog signalling information from received predetermined digital signalling information; and (a2) simulating digital signalling information for transmission from predetermined analog signalling information.

41. The method of operating a data communications device of claim 33 wherein step (e) further comprises:

establishing a data communications connection over the analog communications network.

42. The method of operating a data communications device of claim 41 further comprising:

dialing, line probing, and training if the analog communications network is a public switched telephone network; and line probing and training if the analog communications network is a leased line connection.

* * * * *